(12) United States Patent
Walker et al.

(10) Patent No.: US 7,985,132 B2
(45) Date of Patent: *Jul. 26, 2011

(54) SYSTEM AND METHOD FOR FACILITATING PLAY OF A VIDEO GAME VIA A WEB SITE

(75) Inventors: Jay S. Walker, Ridgefield, CT (US); James A. Jorasch, Stamford, CT (US); Russell P. Sammon, San Francisco, CA (US); Magdalena M. Fincham, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 251 days.

This patent is subject to a terminal disclaimer.

(21) Appl. No.: 11/624,764

(22) Filed: Jan. 19, 2007

(65) Prior Publication Data

US 2007/0117621 A1    May 24, 2007

Related U.S. Application Data

(63) Continuation of application No. 10/159,945, filed on May 30, 2002, now Pat. No. 7,192,352, which is a continuation-in-part of application No. 09/768,567, filed on Jan. 24, 2001, now Pat. No. 6,425,828, which is a continuation of application No. 09/028,781, filed on Feb. 24, 1998, now Pat. No. 6,224,486, which is a continuation of application No. 08/635,576, filed on Apr. 22, 1996, now Pat. No. 5,779,549.

(60) Provisional application No. 60/337,993, filed on Dec. 3, 2001.

(51) Int. Cl.
*A63F 9/24* (2006.01)

(52) U.S. Cl. ............... 463/23; 463/25; 463/42; 700/91; 700/92

(58) Field of Classification Search .................. 463/23
See application file for complete search history.

(56) References Cited

U.S. PATENT DOCUMENTS
2,826,828 A    3/1958    Hamilton
(Continued)

FOREIGN PATENT DOCUMENTS
DE    4222896 A1    1/1994
(Continued)

OTHER PUBLICATIONS
Office Action for U.S. Appl. No. 11/624,737 dated Feb. 6, 2007, 7pp.
(Continued)

*Primary Examiner* — Dmitry Suhol
*Assistant Examiner* — A. Doshi
(74) *Attorney, Agent, or Firm* — Fincham Downs, LLC; Carson C. K. Fincham

(57) ABSTRACT

A method and system for operating a video game or video game tournament (e.g., via a Web site) is disclosed. In accordance with the method and system a bonus is provided to a player playing the video game or participating in the video game tournament. In some embodiments a bonus is provided to the player if a rating associated with the player is worse than a threshold rating. In some embodiments a bonus is provided to the player if the occurrence of at least one predetermined condition is identified. Such a condition may be, for example, a condition that indicates the player will soon cease playing the video game or participating in the tournament.

12 Claims, 8 Drawing Sheets

U.S. PATENT DOCUMENTS

| | | | |
|---|---|---|---|
| 4,586,707 A | 5/1986 | McNeight | |
| 4,592,546 A | 6/1986 | Fascenda | |
| 4,650,190 A | 3/1987 | Geiger | |
| 4,657,247 A | 4/1987 | Okada | |
| 4,669,731 A | 6/1987 | Clarke | |
| 4,679,789 A | 7/1987 | Okada | |
| 4,685,677 A | 8/1987 | Demar | |
| 4,760,245 A | 7/1988 | Fukaya | |
| 4,764,666 A | 8/1988 | Bergeron | |
| 4,858,930 A | 8/1989 | Sato | |
| 4,861,041 A | 8/1989 | Jones et al. | |
| 4,880,237 A | 11/1989 | Kishishita | |
| 4,922,522 A | 5/1990 | Scanlon | |
| 4,996,705 A | 2/1991 | Entenmann | |
| 5,014,298 A | 5/1991 | Katz | 379/93.12 |
| 5,035,625 A | 7/1991 | Munson | |
| 5,073,931 A | 12/1991 | Audebert et al. | 380/251 |
| 5,083,271 A | 1/1992 | Thacher | |
| 5,083,800 A | 1/1992 | Lockton | |
| 5,108,115 A | 4/1992 | Berman | |
| 5,114,155 A | 5/1992 | Tillery | |
| 5,121,919 A | 6/1992 | Martti | |
| 5,121,928 A | 6/1992 | Salerno-Sonneberg | 273/243 |
| 5,127,044 A | 6/1992 | Bonito | |
| 5,132,900 A | 7/1992 | Gilchrist | |
| 5,180,309 A | 1/1993 | Egnor | 434/323 |
| 5,186,471 A | 2/1993 | Van Craeynest | |
| 5,213,337 A | 5/1993 | Sherman | |
| 5,283,734 A | 2/1994 | Von Kohorn | |
| RE34,728 E | 9/1994 | Hall-Tipping | |
| 5,359,510 A | 10/1994 | Sabaleauskas | |
| 5,370,399 A | 12/1994 | Liverance | |
| 5,401,023 A | 3/1995 | Wood | |
| 5,429,361 A | 7/1995 | Raven | |
| 5,453,928 A | 9/1995 | Kaminkow | |
| 5,459,825 A | 10/1995 | Anderson | |
| 5,519,433 A | 5/1996 | Lappington et al. | 725/110 |
| 5,544,892 A | 8/1996 | Breeding | |
| 5,546,523 A | 8/1996 | Gatto | |
| 5,558,339 A | 9/1996 | Perlman | |
| 5,561,811 A | 10/1996 | Bier | |
| 5,593,349 A | 1/1997 | Miquel | |
| 5,637,844 A | 6/1997 | Eiba | |
| 5,639,088 A | 6/1997 | Schneider | |
| 5,643,088 A | 7/1997 | Vaughn | |
| 5,683,082 A | 11/1997 | Takemoto | |
| 5,695,400 A | 12/1997 | Fennell et al. | |
| 5,695,402 A | 12/1997 | Stupak | |
| 5,697,844 A * | 12/1997 | Von Kohorn | 463/40 |
| 5,741,183 A | 4/1998 | Acres | |
| 5,768,382 A | 6/1998 | Schneier et al. | 380/251 |
| 5,770,533 A | 6/1998 | Franchi | |
| 5,779,549 A | 7/1998 | Walker | |
| 5,813,913 A | 9/1998 | Berner | |
| 5,816,917 A | 10/1998 | Kelmer | |
| 5,816,918 A | 10/1998 | Kelly | |
| 5,833,540 A | 11/1998 | Miodunski | |
| 5,846,132 A | 12/1998 | Junkin | |
| 5,851,010 A | 12/1998 | Feinberg | |
| 5,855,516 A | 1/1999 | Eiba | |
| 5,859,416 A | 1/1999 | Gatto | |
| 5,871,398 A | 2/1999 | Schneier | |
| 5,945,988 A | 8/1999 | Williams | |
| 5,970,143 A | 10/1999 | Schneier et al. | |
| 5,971,850 A | 10/1999 | Liverance | |
| 5,983,200 A | 11/1999 | Slotznick | |
| 6,110,041 A | 8/2000 | Walker | |
| 6,113,495 A | 9/2000 | Walker et al. | |
| 6,139,431 A | 10/2000 | Walker et al. | |
| 6,142,874 A | 11/2000 | Kodachi et al. | |
| 6,186,893 B1 | 2/2001 | Walker et al. | |
| 6,193,608 B1 | 2/2001 | Walker et al. | |
| 6,213,873 B1 | 4/2001 | Gasper | |
| 6,224,486 B1 * | 5/2001 | Walker et al. | 463/42 |
| 6,229,879 B1 | 5/2001 | Walker | |
| 6,234,896 B1 | 5/2001 | Walker et al. | |
| 6,254,481 B1 | 7/2001 | Jaffe | |
| 6,254,483 B1 | 7/2001 | Acres | |
| 6,287,194 B1 | 9/2001 | Okada et al. | |
| 6,287,201 B1 | 9/2001 | Hightower | |
| 6,293,866 B1 | 9/2001 | Walker | |
| 6,327,351 B1 | 12/2001 | Walker et al. | |
| 6,331,115 B1 | 12/2001 | Jenkins | |
| 6,336,861 B1 | 1/2002 | Konoe | |
| 6,343,935 B1 | 2/2002 | Clements | |
| 6,343,989 B1 | 2/2002 | Wood | |
| 6,368,215 B1 | 4/2002 | Walker et al. | |
| 6,368,216 B1 | 4/2002 | Hedrick | |
| 6,377,669 B1 | 4/2002 | Walker et al. | |
| 6,379,247 B1 | 4/2002 | Walker | |
| 6,390,917 B1 | 5/2002 | Walker et al. | |
| 6,394,904 B1 | 5/2002 | Stalker | |
| 6,402,614 B1 | 6/2002 | Scneier et al. | |
| 6,425,828 B2 | 7/2002 | Walker et al. | |
| 6,427,063 B1 | 7/2002 | Cook | |
| 6,468,155 B1 | 10/2002 | Zucker et al. | |
| 6,500,068 B2 | 12/2002 | Walker et al. | |
| 6,530,835 B1 | 3/2003 | Walker et al. | |
| 6,582,310 B1 | 6/2003 | Walker et al. | |
| 6,607,439 B2 | 8/2003 | Scneier et al. | |
| 6,652,378 B2 | 11/2003 | Cannon et al. | |
| 6,690,779 B2 | 2/2004 | Walker et al. | |
| 6,755,741 B1 | 6/2004 | Rafaeli | |
| 6,848,995 B1 | 2/2005 | Walker et al. | |
| 6,890,256 B2 | 5/2005 | Walker et al. | |
| 6,893,341 B2 | 5/2005 | Walker et al. | |
| 6,942,570 B2 | 9/2005 | Scneier et al. | |
| 7,008,318 B2 | 3/2006 | Scneier et al. | |
| 7,063,618 B2 | 6/2006 | Walker et al. | |
| 7,086,947 B2 | 8/2006 | Walker et al. | |
| 7,094,149 B2 | 8/2006 | Walker et al. | |
| 7,101,282 B2 | 9/2006 | Walker et al. | |
| 7,192,352 B2 | 3/2007 | Walker et al. | |
| 7,198,572 B2 | 4/2007 | Walker et al. | |
| 7,241,219 B2 | 7/2007 | Walker et al. | |
| 7,285,045 B2 | 10/2007 | Scneier et al. | |
| 7,362,862 B2 | 4/2008 | Scneier et al. | |
| 7,390,255 B2 | 6/2008 | Walker et al. | |
| 7,416,485 B2 | 8/2008 | Walker et al. | |
| 2006/0287046 A1 | 12/2006 | Walker | |
| 2007/0117619 A1 | 5/2007 | Walker et al. | |

FOREIGN PATENT DOCUMENTS

| | | |
|---|---|---|
| EP | 0843272 A1 | 5/1998 |
| GB | 2167676 A | 6/1986 |
| WO | WO94/01839 | 1/1994 |
| WO | WO96/07867 | 3/1996 |

OTHER PUBLICATIONS

Notice of Allowability for U.S. Appl. No. 11/624,752 dated Apr. 2, 2008, 4pp.

Microsoft Windows, "Solitaire", 1981, 1pp.

"Casino's Computers Keep Tabs on Losers", Chicago Tribune, Oct. 2, 1985, Section: Business, p. 14, Zone C, 3pp.

Fisher, Harvey, "Casino Law Ends Cash Rebates for Big-Time Losers", The Record, Jan. 15, 1988, Section: News, p. A05, 2pp.

Kent, Bill, "New Boardwalk Barter; Atlantis Introduces A Token as Enticement", The Record, Jul. 22, 1988, Section: Lifestyle/Previews, p. 032, 3pp.

Raphel, Murray, "Casinos gamble on direct mail: Atlantic City casinos; Retail; Industry Overview", Direct Marketing Magazine, Feb. 1992, Section: vol. 54, No. 10, p. 32, ISSN: 0012-3188, 5pp.

Freedman, David H., "Odds Man In", Forbes, Oct. 25, 1993, Section: Forbes ASAP, Quick Studies, p. 33, 5pp.

Franklin, Stephen, "Pinball Power Puts Money Into The Slots", Chicago Tribune, May 9, 1994, Section: Business, p. 1, Zone C, 3pp.

Salmon-Heyneman, Jana, "Gaming propels fastest growing publicly traded firm in valley", Las Vegas Business Press, Jul. 11, 1994, Setion: vol. 11, No. 27, Sec. 1, p. 1, 5pp.

Grochowski, John, "Casino Insider Offers a Guide to Freebies", Chicago Sun-Times, Aug. 12, 1994, Section: Weekend Plus, Gaming, p. 31, NC, 2pp.

Troy, Timothy N., "High stakes technology; technology for guest retention management", Hotel & Motel Management, Sep. 19, 1994, Section: vol. 209, No. 16, p. 27, ISSN: 0018-6082, 4pp.

Troy, Timothy, N., "Flexibility a key for vendors betting on casinos; Micros Systems Inc.'s 8700 point-of-sale system", Hotel & Motel Management, Sep. 19, 1994, Section: vol. 209, No. 16, p. 27, ISSN: 0018-6082, 2pp.

Grochowski, John, "Riverboat Comp Systems Cracking a Case in Point", Chicago Sun-Times, Mar. 17, 1995, Section: Weekend Plus, Gaming, p. 13, 1pp.

Sherman, Debra, "Company Launches New Player Tracking System", The Reuter Asia-Pacific Business Report, Oct. 20, 1995, 2pp.

Berry, Kate, "Anchor Gaming Inc.", Investor's Business Daily, May 2, 1996, Section: The New America, p. A6, 3pp.

Mattox, Jake, "Huntington Press: Publishing the books on Las Vegas", Las Vegas Business Press, Sep. 16, 1996, Section: vol. 13, No. 51, p. 3, 3pp.

"Open Market Announces Sale of OM-Express Desktop Software Product to DocuMagix . . . ", PR Newswire, Nov. 7, 1996, Section: Financial News, 3pp.

Grochowski, John, "Comp points add up faster playing slots", Chicago Sun-Tribune, Nov. 8, 1996, Section: WKP, Gaming, p. 23, NC, 3pp.

Microsoft Windows, Solitaire screens and information, (http //www microsoft com/WINDOWS2000/en/professional/help/), Download date: Mar. 19, 2001, 4pp.

"Alpha Sports Games You Could Win $10,000 This Week!", (http //www alphasportsgames com), download date: Jan. 1996, 3pp.

"Red Baron—Operation, Maintenance and Service Manual", Copyright 1981 by Atari Inc.3pp.

Website: "Atari Red Baron Page", (http //www gamearchive com/video/manufacturer/Atari/vector/html/red-baron html), download date: Mar. 28, 2001, 2pp.

"The Electric Company* Math Fun", Intellevision Productions, Inc., (http www makingit com/bluesky/games/instructions/learning/mathfun txt), download date: Mar. 28, 2001, 4pp.

Eatough, Mitch, "Gamezilla!—Unreal Tournament by GT Interactive", (http www gamezilla com/reviews/u/unrealtourn asp), download date: Mar. 28, 2001, 2pp.

Website: "THINKfast 'thinkfast htm—THINKfast Software", (http www comptronic com/thinkfas htm), download date: Mar. 28, 2001, 2pp.

"Word Punzzles With a Twist, Exercises for Your Brain", Pinnacle Solutions, (http // www iquest com), Copyright 1995 Pinnacle Solutions, 6 pp.

"Alpha Sports Games, You Could Win $10,000 This Week!", (http // www alphasportsgames com), download date: Jan. 1996, 3 pp.

"CONTEST: Worst Experience with a Salesperson", Sponsored by Galileo, Peter Letterese & Associates, Inc., (http // www Galileo com), download date: Jan. 1996, 2 pp.

"How to play the POOL!, Compete with people all across the net and win big prizes!", (http // www cybertainment com), download date: Jan. 1996, 2 pp.

"The Rules", Bert & Associates, Inc., (http // www bert&associates com), download date: Jan. 1996, 4 pp.

"Who's In Front of This Behind Contest!", (http // www roarmouse com), download date: Jan. 1996, 2 pp.

"Win $200! from The Gate", (http // www sfgate com), download date: Jan. 1996, 2 pp.

"Yoyodyne Games", (http //www yoyo com), download date: Jan. 1996, 6 pp.

Office Action for U.S. Appl. No. 08/635,576 dated Feb. 4, 1997, 7pp.

Office Action for U.S. Appl. No. 08/635,576 dated Nov. 12, 1997, 11 pp.

Notice of Allowability for U.S. Appl. No. 08/635,576 dated Mar. 17, 1998, 1 pp.

Office Action for U.S. Appl. No. 09/768,567 dated Jun. 28, 2001, 12 pp.

Notice of Allowability for U.S. Appl. No. 09/768,567 dated Jan. 25, 2002, 2 pp.

Supplemental Notice of Allowability for U.S. Appl. No. 09/768,567 dated Apr. 17, 2002, 2 pp.

Office Action for U.S. Appl. No. 09/028,781 dated Oct. 19, 1999, 5 pp.

Office Action for U.S. Appl. No. 09/028,781 dated Feb. 18, 1999, 10 pp.

Notice of Allowability for U.S. Appl. No. 09/028,781 dated Apr. 20, 2000, 4 pp.

Notice of Allowability for U.S. Appl. No. 09/028,781 dated Oct. 19, 2000, 4 pp.

European Supplemental Search Report for Application No. EP97923574 dated Dec. 20, 2000, 3 pp.

Communication Pursuant to Article 956(2) EPC for Application No. 97923574 dated Jan. 15, 2004, 5pp.

International Search Report for Application No. PCT/US97/07703 dated Jul. 9, 1997, 5 pp.

Written Opinion for Application No. PCT/US97/07703 dated Feb. 20, 1998, 4 pp.

International Preliminary Examination Report for Application No. PCT/US97/07703 dated Jun. 8, 1998, 16 pp.

Office Action for U.S. Appl. No. 09/962,065 dated Oct. 4, 2005, 4 pp.

Office Action for U.S. Appl. No. 09/962,065 dated Mar. 23, 2005, 9 pp.

Office Action for U.S. Appl. No. 09/962,065 dated Oct. 6, 2004, 5 pp.

Office Action for U.S. Appl. No. 09/962,065 dated Aug. 29, 2003, 5 pp.

Office Action for U.S. Appl. No. 09/481,204 dated Jul. 15, 2000, 5 pp.

Notice of Allowability for U.S. Appl. No. 09/481,204 dated Dec. 1, 2000, 5 pp.

Notice of Allowability for U.S. Appl. No. 09/481,204 dated May 4, 2001, 1 pp.

Office Action for U.S. Appl. No. 08/775,388 dated Feb. 11, 1999, 5 pp.

Notice of Allowability for U.S. Appl. No. 08/775,388 dated Oct. 11, 1999, 2 pp.

Office Action for U.S. Appl. No. 10/159,945 dated Aug. 23, 2005, 12 pp.

Office Action for U.S. Appl. No. 10/159,945 dated Feb. 13, 2006, 8 pp.

Notice of Allowance for U.S. Appl. No. 11/624,798, dated Jun. 30, 2008. 11 pp.

Office Action for U.S. Appl. No. 11/624,787, dated May 16, 2008, 9 pp.

Office Action for U.S. Appl. No. 11/624,787, dated Nov. 21, 2008, 16 pp.

Office Action for U.S. Appl. No. 11/624,737, dated Feb. 6, 2008, 8 pp.

Office Action for U.S. Appl. No. 11/624,737, dated Jul. 9, 2008, 8 pp.

Office Action for U.S. Appl. No. 11/624,729, dated Sep. 30, 2008, 13 pp.

Office Action for U.S. Appl. No. 11/624,716, dated May 29, 2009, 15 pp.

Notice of Allowance for U.S. Appl. No. 10/159,945, dated Sep. 26, 2006, 5 pp.

Office Action for U.S. Appl. No. 11/624,716, dated Oct. 6, 2008, 11 pp.

Office Action for U.S. Appl. No. 11/461,630, dated Sep. 30, 2008, 11 pp.

Notice of Allowance for U.S. Appl. No. 11/624,752, dated Apr. 2, 2008, 7 pp.

* cited by examiner

SYSTEM AND METHOD FOR FACILITATING PLAY OF A VIDEO GAME VIA A WEB SITE

The present application is a continuation of U.S. patent application Ser. No. 10/159,945, filed May 30, 2002, now U.S. Pat. No. 7,192,352, entitled "SYSTEM AND METHOD FOR FACILITATING PLAY OF A VIDEO GAME VIA A WEBSITE"; which:

(i) claims the benefit of Provisional patent application Ser. No. 60/337,993, filed Dec. 3, 2001, entitled "SKILLGAMES POINTS BALANCING"; and (ii) is a continuation-in-part application of U.S. patent application Ser. No. 09/768,567, filed Jan. 24, 2001, and entitled "DATABASE DRIVEN ONLINE DISTRIBUTED TOURNAMENT SYSTEM", and which issued Jul. 30, 2002 as U.S. Pat. No. 6,425,828, which is a continuation application of U.S. patent application Ser. No. 09/028,781, filed Feb. 24, 1998, entitled "DATABASE DRIVEN ONLINE DISTRIBUTED TOURNAMENT SYSTEM", and which issued May 1, 2001 as U.S. Pat. No. 6,224,486, which is a continuation application of U.S. patent application Ser. No. 08/635,576, filed Apr. 22, 1996, entitled "DATABASE DRIVEN ONLINE DISTRIBUTED TOURNAMENT SYSTEM", and which issued Jul. 14, 1998 as U.S. Pat. No. 5,779,549.

Each of the above-referenced applications is incorporated by reference herein in its entirety.

FIELD OF THE INVENTION

The present invention relates generally to games, and more particularly to video games that are capable of being played via a Web site.

BACKGROUND

Online gaming Web sites allow participants to "meet" in cyberspace, competing at a virtual location accessible to any player at any time. However, there are drawbacks that exist in such online group play of video games and video game tournaments. For example, players of relatively lower skill level or that achieve relatively lower success when competing in a group video game or game tournament may become discouraged and refrain from play. Such a problem may be particularly acute if the game or tournament is being played for a prize. A player who does not often win a prize or come close to winning a prize because the player's skill level or luck is below that of other players may become discouraged, depressed, or even angry that they are not able to win prizes like they want to.

Unhappy players are detrimental to the development and maintenance of a successful and popular gaming Web site. For example, unhappy players may complain to their friends or relatives and convince them to stop patronizing the gaming Web site. Unhappy players themselves may stop patronizing the gaming Web site or contact the Web site's customer service department frequently, thus increasing the costs for the Web site. The avoidance of unhappy players may be of particular concern to a gaming Web site that collects entry fees from players that participate in games or tournaments or whose revenue depends on advertising monies that are generated based on the number of players patronizing the Web site. Accordingly, there is a need to minimize the number of players that become unhappy as a result of their poor performance during play of a game or tournament on a gaming Web site.

Figure 1:
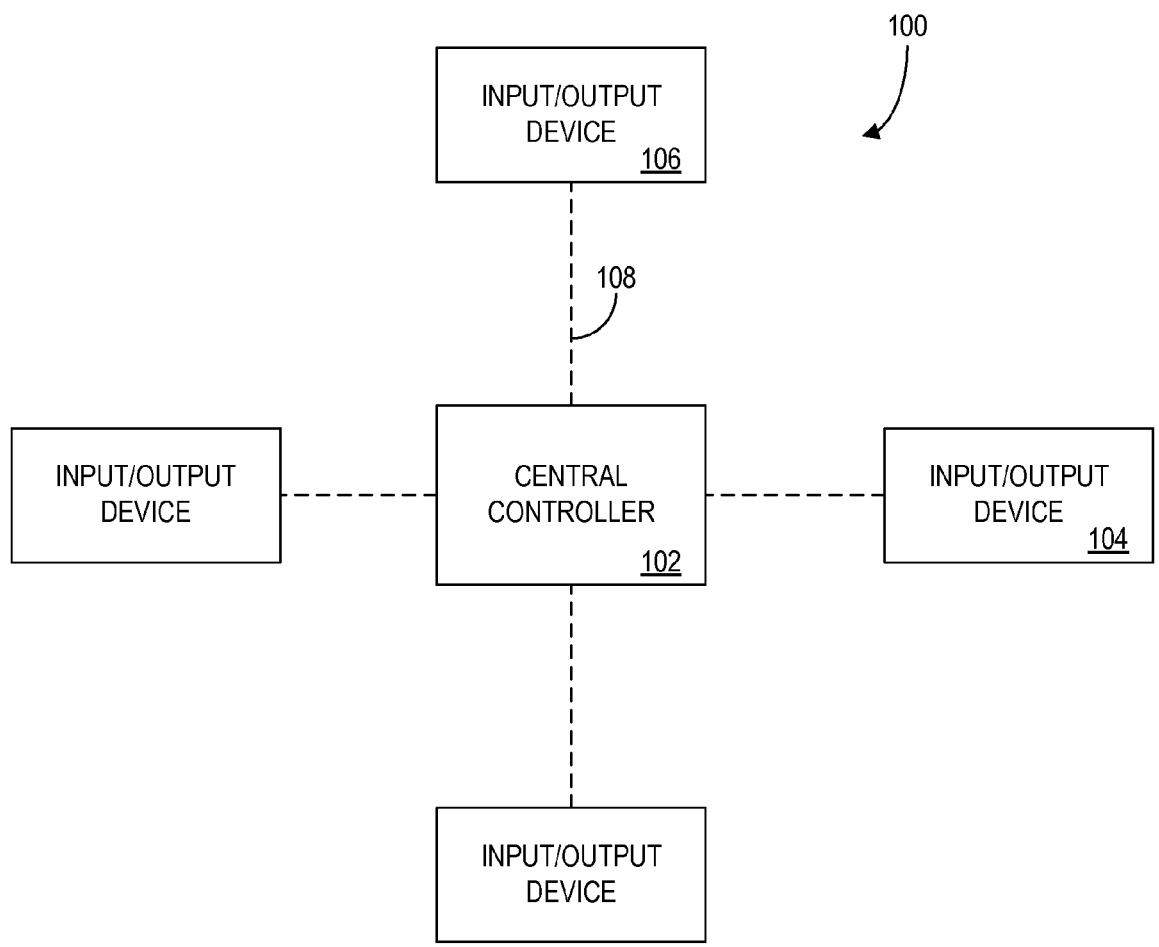
FIG. 1 is a block diagram of a distributed electronic tournament system in accordance with one embodiment of the present invention.

The numerals in FIGS. 1-10 are assigned to similar elements in all the figures. Embodiments of the invention are discussed below with reference to FIGS. 1-10. Those skilled in the art will readily appreciate that the detailed description given herein with respect to these figures is for explanatory purposes, as the invention extends beyond these limited embodiments.

DETAILED DESCRIPTION OF THE INVENTION

An object of the present invention is to provide methods and devices for effectively operating multiple database-driven distributed electronic game tournaments for remotely located players. The present invention provides numerous advantages over existing tournament systems; such as simplifying the collection of entry fees and the payment of prizes, as well as allowing for rating and handicap systems.

Another object of the present invention is to provide methods and systems for minimizing the number of players that do not obtain any benefit as a result of their participation in a game or tournament through a gaming Web site.

In the invented system, players pay entry fees for the right to compete for substantial prizes in electronic tournaments. Unlike existing tournament systems, the present invention allows for the coordination of multiple tournaments, making each tournament part of a whole rather than a stand-alone individual event.

In one preferred embodiment, a central controller manages the tournament system, coordinating both the players and game software with which the players compete. The system uniquely identifies each player as they log on, authenticating the associated input/output device that is connected to the central controller. This unique identifier allows other players to know whom they are competing against. Each player typically pays the system an entry fee before participating in a particular tournament, with payment delivered through the associated input/output device. The tournament begins and ends within a fixed time window, typically measured in hours or minutes.

After each tournament is over, the system evaluates player performance, awarding prizes to those players achieving pre-established performance levels.

Due to the complexity of coordinating multiple tournaments, one embodiment includes the use of a database. In this embodiment the central controller accesses the database to store player information that is generated as the player participates in the tournament. Such information is available for use in a subsequent tournament, which is administered by the controller and in which the player participates.

In another preferred embodiment with the central controller, each tournament game is broken down into a series of game sessions in which players must qualify in one game session in order to be eligible to play in the next. This elimination format significantly increases tension and enhances excitement in the games, since only the best players are left fighting for the top prizes in the final game session. In such an embodiment, each subsequent game session has at least one fewer player than a previous game session.

Other aspects and advantages of the present invention will become apparent from the following detailed description, which, when taken in conjunction with the accompanying drawings, illustrates by way of example the principles of the invention.

FIG. 1 shows a distributed electronic tournament system 100 with a central controller 102 connected to a number of input/output (I/O) devices, 104 and 106, in the present invention. The input/output device may be a video gaming console, a personal computer, handheld electronic device, and the like. The central controller may be a workstation, a minicomputer, or other type of computation device, typically in the form of a server computer connected to a public or private network. The I/O devices are remotely located from the central controller to allow participation in a tournament to be distributed. The I/O devices preferably are connected to the central controller, at least when the I/O devices are involved in games. Such connection may be through a wireless telecommunication network or through a ground-based network 108, such as the Internet. While online, the I/O device typically communicates with the network via a public or private switched network such as the circuit switched public telephone network. The central controller has software which it uses to manage the tournament. In one preferred embodiment, the I/O devices are personal computers connected to an online service such as America Online. The central controller is a workstation computer on America Online that coordinates the tournament activities.

The tournament databases are preferably relational, in which fields from one database are linked to fields of at least one other database. These databases are controlled by a database management system (DBMS) which organizes, stores, and retrieves the tournament's data/information. The DBMS communicates with the operating system to read data from the storage device. The database is associated with or resides at the central controller.

The operating system software runs the central controller hardware and controls and coordinates all of the tournament software applications. These software applications include programs for running the tournament games, registering players, accepting entry fees, and coordinating prize payment. Tournament games might be commercially available software programs such as Microsoft Golf™, or proprietary game software designed exclusively for online tournament play.

The above hardware and software are configured to implement the tournaments in the present invention. Each tournament has a game format, one or more game sessions, and challenges as will be described in more detail later. The game format is the broad category that describes the type of game being played.

Typically, the database system is managed by the central controller and communicates with the game software used to conduct the actual tournament. The game software handles operational issues such as displaying the game format on the I/O device screen, calculating scores, controlling player access to tournaments, etc.

Figure 2:
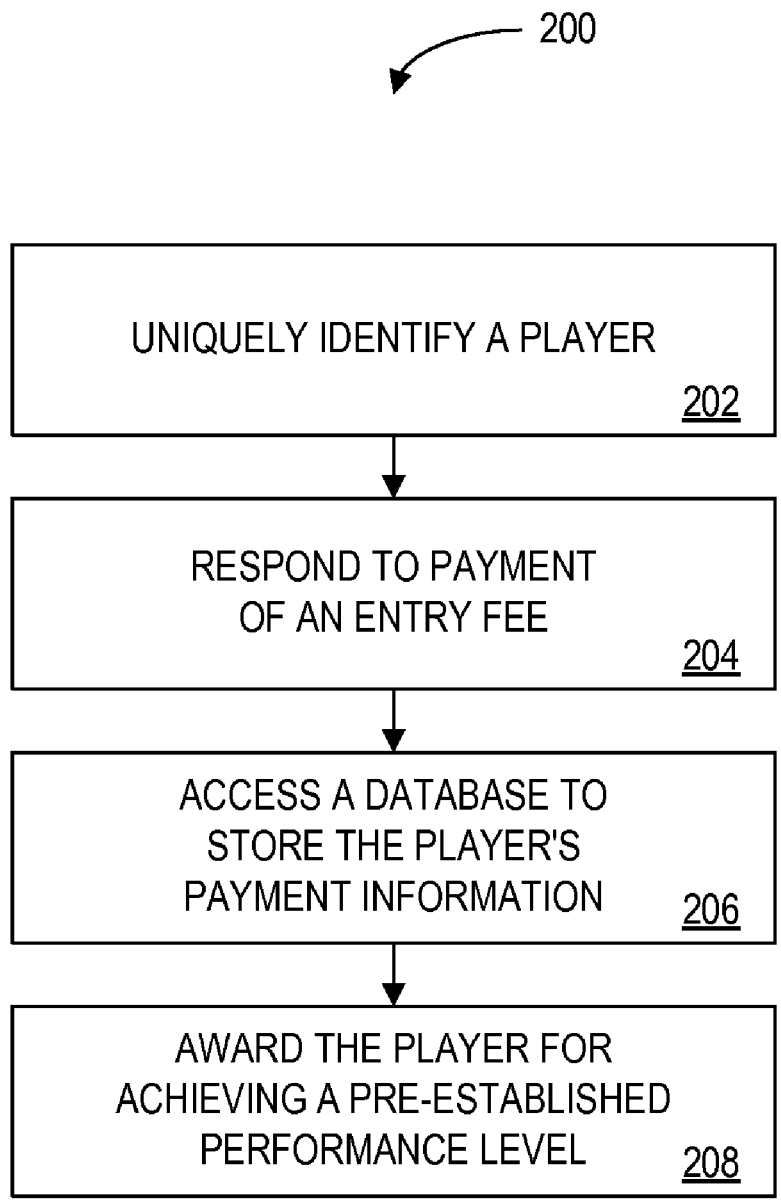
FIG. 2 shows one embodiment implementing the present invention.

FIG. 2 shows one embodiment 200 implementing the present invention. Although the control of the operations of the I/O devices and the central controller are typically incorporated into software code, such operations can also be embodied in hardware circuits to implement the invention. The embodiment 200 includes: (1) process steps 202 for uniquely identifying a player, who communicates with the central controller via an associated input/output device; (2) process steps 204 responsive to payment of an entry fee by a player for allowing the player to participate in a particular tournament via an associated input/output device; (3) process steps 206 for accessing a tournament database to store player information that is generated as the player participates in the tournament, such information being available for use in a subsequent tournament, which is administered by said controller and in which the player participates; and (4) process steps 208 for awarding a player a prize for achieving a pre-established performance level.

These process steps are typically implemented by the central computer controller in order to make tournament operations faster and more cost efficient. A number of different preferred embodiments of the above steps will be described to provide a general view of methods to implement each set of process steps. The different ways serve only as examples. After the general overview, more detailed descriptions and examples follow.

Figure 3:
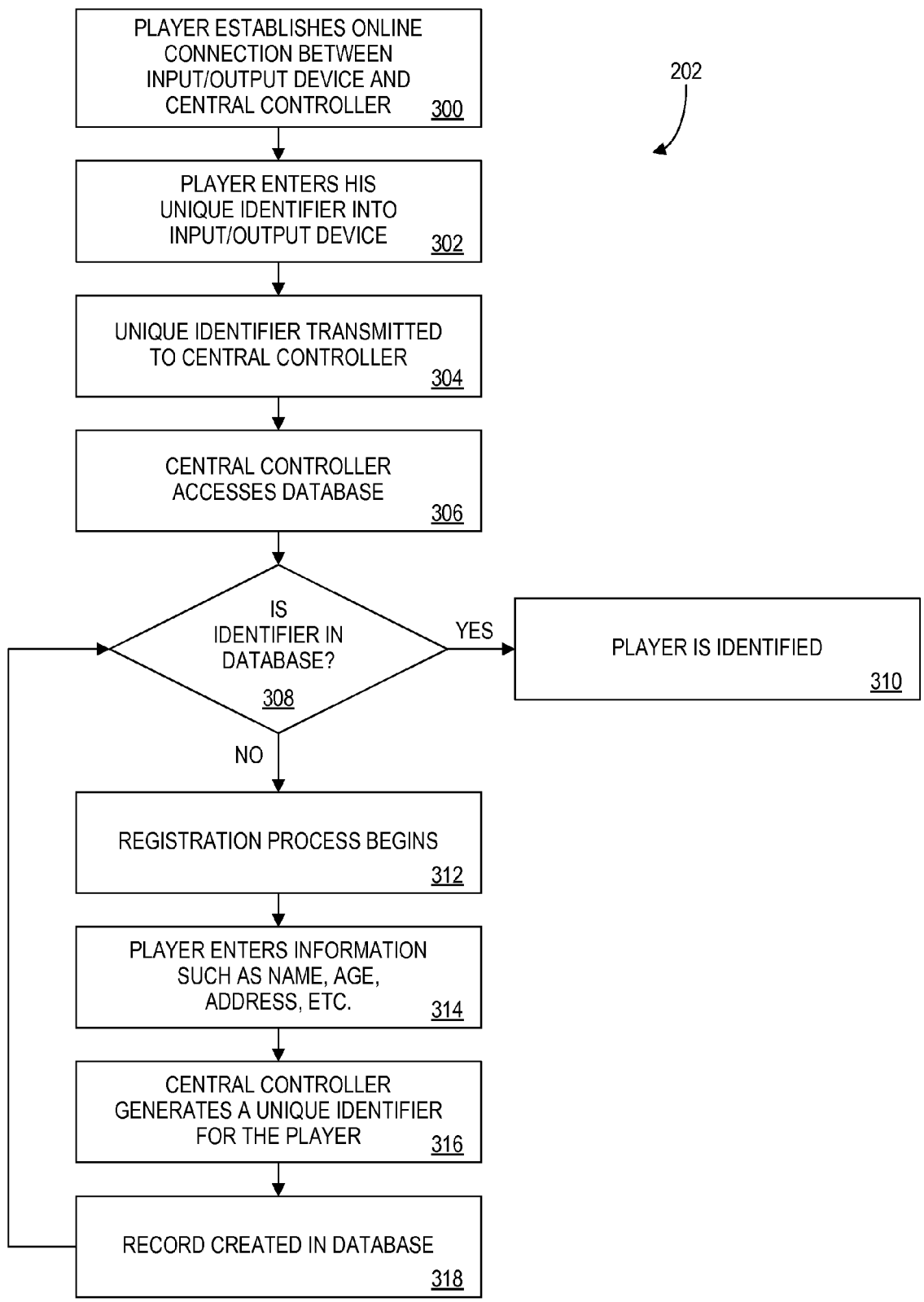
FIG. 3 is a flow process that illustrates a method, in accordance with one embodiment of the present invention, of uniquely identifying a player.

The process steps 202, as shown in FIG. 3, for uniquely identifying a player preferably include the steps of a player establishing 300 an online connection between the I/O device and the central controller. The player enters 302 a unique identifier through the associated I/O device. The identifier is assigned by the central controller or chosen by the player. The identifier can be his name, social security number, account number, password of his choosing, etc. It is important to note that although the player may be uniquely identified to the central controller, he may at the same time remain anonymous with respect to the other competitors in the tournament. The unique identifier is then communicated 304 to the central controller via the communication network. The central controller accesses 306 a database and searches 308 the records to determine whether or not the identifier already exists. If the record already exists, the player is identified 310; when the record does not already exist the registration process 312 begins in which the player enters 314 information such as name, age, address, payment preferences, etc. The central controller generates 316 a unique identifier for the player and stores 318 it in the database.

Figure 4:
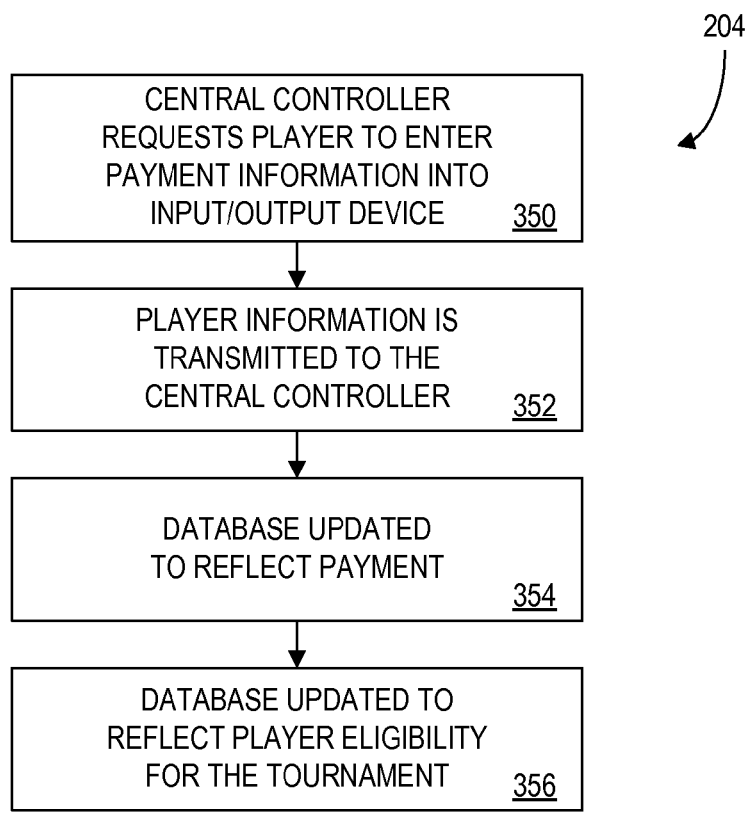
FIG. 4 is a flow process that illustrates a method, in accordance with one embodiment of the present invention, of responding to payment of an entry fee.

In one embodiment, a player must pay an entry fee to the central controller through the associated I/O device before he is allowed to participate in a tournament. The process steps 204, as shown in FIG. 4, responsive to the payment of an entry fee to a tournament typically include the steps of the central controller requesting the player to enter 350 payment information into the I/O device. Details of payment methodologies are described below in more detail. The payment information is communicated 352 to the central controller via the communication network. The central controller receives and updates 354 the player's record in the database to reflect that payment has been made and also updates 356 the player's database record to reflect that the player is eligible to participate in the tournament. In another preferred embodiment, the controller does not have to request information, and no payment information is communicated to the controller. This may be because the player has played before, and the controller is aware of the player's preferences as described below.

After determining that the player is eligible to play, the controller sends an acknowledgment message to the associated I/O device. When the tournament starts, the player is able to begin play.

Figure 5:
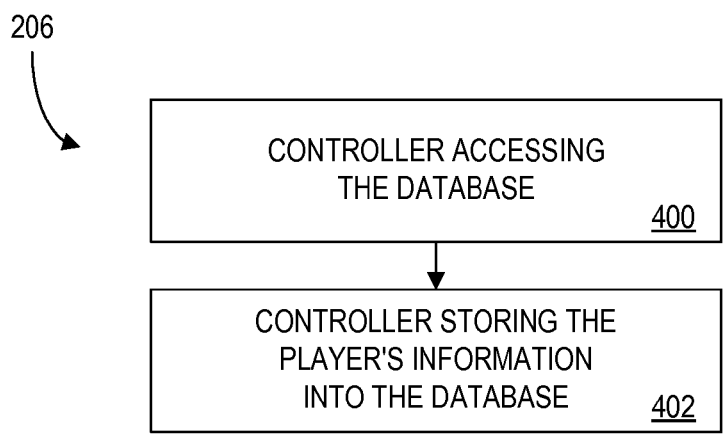
FIG. 5 is a flow process that illustrates a method, in accordance with one embodiment of the present invention, of accessing player information collected from prior tournaments.

FIG. 5 describes the process steps 206 for accessing a tournament database to store player information. The central controller accesses 400 the tournament database and then stores into the database 402 the player's information generated by the player as the tournament progresses.

Player information stored in the database includes entry fee data, handicap and rating information, player performance data and player preferences. Storing entry fee data, such as a credit card number or bank account number, streamlines the payment process for subsequent tournaments. When paying for a tournament, the player simply provides his unique identifier to the central controller, which pulls his credit card number from the database and credits his card for the appropriate entry fee amount. Because many online environments have yet to implement effective transaction security protocols, reducing the number of times a credit card number is transmitted enhances security.

Player performance data can also be carried forward from one tournament to the next. In addition to wins and losses, performance data can include accuracy rates, time required to answer, etc. If a player competes in five trivia tournaments, for example, his average accuracy rate is stored in a database. Such information is crucial in establishing handicap systems, which level the playing field by penalizing the better players and aiding the weaker players. A golf handicap, for example, allows a skilled player to compete with a relatively inexperienced player. Performance data can also be used to generate player ratings, similar to the Elo rating system used by the United States Chess Federation. Ratings are numeric values that represent the skill of the player. The central controller retrieves performance data from a database and applies an algorithm to determine the rating. A player's rating rises and falls depending on the results of his play. Ratings allow tournaments to be easily segmented by skill level.

Storing performance data allows the central controller to restrict eligibility to future tournaments. Certain tournaments, for example, may be available only to players having obtained a given level of performance in a number of qualification tournaments.

A database of performance data also allows inter-tournament prize pools in which a player is eligible for a prize based not on the results in a single tournament, but on a combination of tournaments. For example, in addition to a normal weekly prize, there may be a grand prize awarded to the player winning the greatest number of weekly prizes over a year period.

Continuity between tournaments is improved by storing player preferences. Once a player's preference for method of prize payment is established, for example, the central controller no longer needs to ask how the player wants to be paid. By storing player preferences for tournament formats, the central controller can send tournament details to a player when any tournaments of this type are scheduled in the future. Tournaments are also more fun for players when data are stored as to favorite opponents, allowing the central controller to better allocate players among tournament sections.

After player information is stored in the database, it is available for use in a subsequent tournament (administered by the central controller) in which the player participates.

Figure 6:
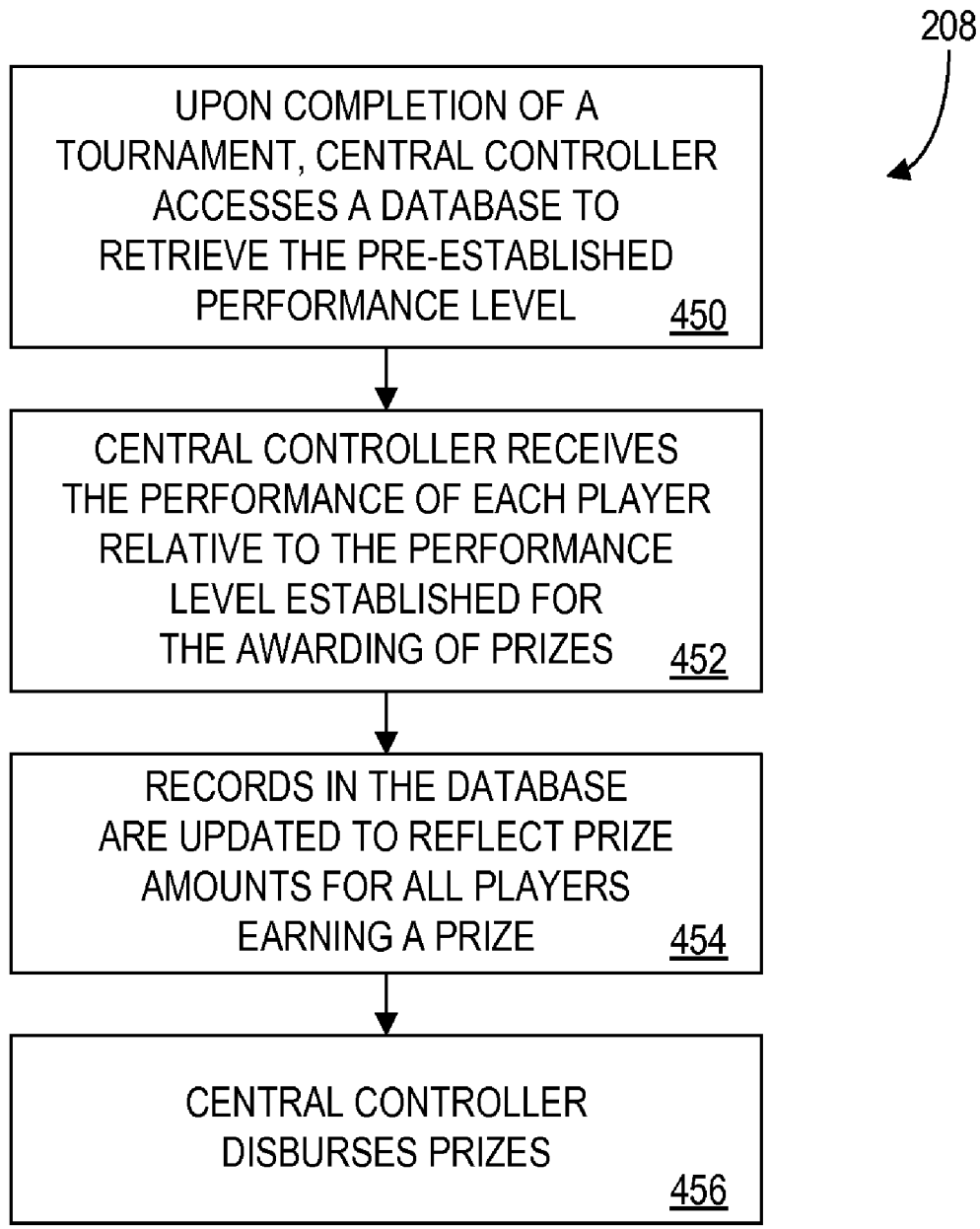
FIG. 6 is a flow process that illustrates a method, in accordance with one embodiment of the present invention, of awarding a player a prize.

The process steps 208, as shown in FIG. 6, for awarding a player a prize include the steps of the central controller accessing 450 the tournament database to retrieve the pre-established performance levels for the awarding of prizes. The central controller reviews 452 the performance of each player relative to the established performance requirements for the awarding of prizes. Preferably, the central controller updates 454 the winning player's database records to reflect that awards have been allocated to them. The central controller would then arrange for distribution 456 of the prize or prizes. This distribution process can be conducted through online or off-line methods.

Typically, the pre-established performance level is a relative ranking among players, such as the top five scores of the tournament. Performance criteria can also be fixed, however, with prizes paid to any player exceeding a certain score. A trivia tournament, for example, can award a prize to any player correctly answering at least twenty questions. Fastest time to completion is another way to establish performance levels.

Prizes awarded might be $100 for the player getting the top score, $50 for the player with the second highest score, and $25 for the third highest score. Alternatively, top scores could receive free entry fees to future tournaments, or points which may be accumulated and converted later into prizes. Although prizes are typically monetary in nature, prizes such as recognition may be equally appropriate. The recognition of being able to advance from one game session to the next game session can also be considered a prize.

Another embodiment includes the step of determining whether a player has qualified for advancement to the next game session. This includes the step of the central controller reviewing the player's score after the just-concluded game session. This score is compared to the scores obtained by all of the other players in the same session. Based on these scores, the central controller produces a list of those participants qualifying for the subsequent session. There are a number of embodiments for the qualifying criteria, including, for example, a minimum required score, a minimum average score over the last several game sessions, or the maximum score within a sub-group of players in the game session. Only those on the qualified list would be allowed to continue to play in the subsequent game session.

The central controller generates a list of players qualified for the subsequent game session. In one preferred embodiment, the number of players on the qualification list is at least one fewer than the number playing in the previous game session. Note that in the present invention, a game session includes one or more games with a group of players playing the games within an established time frame. In a trivia tournament of four game sessions, the first session may be composed of ten groups of fifty players each for a total of five hundred players. The second game session may comprise five groups of sixty players each for a total of three hundred players. Although the size of the playing group has increased from fifty to sixty, the overall number of players in the game session has dropped from five hundred to three hundred. In this embodiment, it is at the point of elimination that the boundary of game sessions is defined.

In one embodiment, the central controller also prevents those players not qualified to play from participating in a tournament. The central controller generates a game session password which is distributed only to qualified players. Without the correct password, non-qualified players are unable to compete. In one preferred embodiment, players must enter an electronic "chat room" (of the type commonly found on most commercial online systems) in order to obtain the game questions. Access to this room is password protected so that only authorized players are allowed access to the questions. The central controller might also enforce qualification rules by terminating a player's online connection, or by merely preventing a non-qualified player from winning any prize.

The following illustrates a number of more detailed examples of the tournament system. Some of these examples also show different preferred embodiments of the system.

In terms of game formats, examples include strategy games (chess, checkers, bridge, etc.) and puzzles (crossword, jigsaw, etc.). Each tournament has one or more game sessions which are sub-units of the tournament. After completion of the first game session, one or more players may be eliminated from the tournament. Each game session is further broken down into one or more challenges, which are the puzzles, trivia questions, or games in which the players compete. A trivia tournament, for example, may have three game sessions scheduled for start times of 1:00 PM, 2:00 PM, and 3:00 PM. Each game session may have twenty challenges—in this case multiple-choice questions. After a player completed the twenty questions of the first game session, the central controller would determine whether or not the player had qualified to advance to the next round at 2:00 PM. After the twenty questions of the 3:00 PM game session a winner would be determined and prizes would be awarded. In another example, a golf tournament may be held in which there is one game session and nine challenges—in this case nine holes of electronic golf. The player's score for the tournament is simply the total number of strokes taken to complete the nine holes.

Each game session takes place within a fixed time window, and thus has an established start and stop time. The first game session of the puzzle tournament, for example, may start at 1:00 PM and end at 3:00 PM. For some game formats, however, all players do not have to start and stop at the same time. Some players may start later than others, and some players may finish earlier than others. As the tournament progresses, more and more players are eliminated. Although the final game session typically determines the winners for the tournament, merely advancing from one game session to the next may qualify the player for a prize or recognition. Typically, game sessions become progressively harder as the tournament continues.

Although the above preferred embodiments have described tournaments based on games of skill, the same tournament structure is equally applicable to games of chance or to games that involve a combination of skill and chance. Computer golf games, for example, require a great deal of skill in the form of hand/eye coordination, but may also contain elements of chance, such as a randomly generated wind speed.

In one preferred embodiment, the number of players for each game session has no upper limit and is constrained only by the availability of I/O devices. In another preferred embodiment, the number of players is restricted by an established ceiling, restricting tournament registrations to a fixed maximum. Each tournament thus has a number of open positions which are gradually filled as players register. Although these positions are typically available on a first-come first-served basis, positions can be set aside for a select group of premium players who may be designated as such by the central controller. These positions are held open until a fixed time before the start of the game session. At that preset time, the reserved positions are made available to all players, including those not within the selected group. In a tournament limited to one hundred players, for example, five positions may be held for premium players. After the ninety five open positions are filled, only registrations from premium players are accepted. If no premium players take these positions, they may be made available to all players twenty minutes before the start of the first game session.

Tournaments can also accommodate team play. The unique identifier for a player then becomes associated with an identifier for a team so that the central controller can incorporate the player into a team. Scores of the individual members of a team may be averaged to generate a team score, or perhaps the top score from each team represents the team score. In addition to a player's database record indicating the names of any teams that he is on, there might also be a database record for each team listing the players that are members.

There are, of course, many different game formats that lend themselves to electronic online tournament competition. The following eight general categories provide a brief summary.

Dexterity games are perhaps the most common games seen in an online environment. These games require hand/eye coordination and are usually patterned after arcade video games or personal computer games. Examples include martial arts fighting games or flight simulators. Such games are often referred to as "twitch" games since even the slightest mistake in coordination can prove fatal to a player's chances. Another category of dexterity games is sports games. Computer golf, for example, is played on millions of personal computers. Players enter parameters such as the type of club used, the placement of their feet, the force with which they hit the ball, the direction of the shot, etc. The computer calculates where the ball should go and displays the new ball position on the screen of the I/O device. In an online tournament, players might compete in a "closest to the pin" tournament. The above parameters would be sent to the central controller which calculates where the ball landed. The player whose ball lands closest to the pin, for example, may win a prize or qualify to advance to a subsequent game session.

The game of golf also lends itself to hole-in-one competitions. For his entry fee, each player gets five virtual golf balls to hit. Starting from a given par three hole, any hole-in-one is awarded with a prize. To prevent players from eventually discovering the optimal mix of parameter inputs (foot placement, force of swing, etc.), game characteristics such as pin placement, tee location, and sand trap location could be varied for every tournament. Course configurations would be stored in the tournament database for every course.

Another popular electronic game format involves answering questions with deterministic answers, such as trivia games. Players are presented with questions that have a definite answer. This type of game format is particularly well suited to online tournaments since the amount of information exchanged between the central controller and the I/O devices is minimal due to the text-based nature of the game. A question might require the player to type in the correct answer, or select from a list of potential answers. Linked to the tournament database would be a database devoted to storing questions and answers, from which trivia tournaments would extract questions. In addition to thousands of questions and answers, this database would contain fields for the category of question (sports, movies, geography, etc.), the date in which the question entered the database, the number of times the question had been used, the difficulty of the question (predicted by the tournament organizers), and a list of tournaments that had already used the question. This last database field is especially important given the time and expense associated with creating questions and answers, since the re-use of some questions is almost inevitable. While tournament organizers obviously do not want to have players seeing questions for the second time, they also do not want to throw out a question that only a small percentage of potential tournament participants have seen. Databases provide the best compromise since it is possible to track exactly which tournaments (and thus what players) have seen a question. When questions are selected for a given tournament, the database would be searched to see whether any player in this tournament had participated in another tournament which had already seen the question.

Databases also make possible tournaments in which teams of players each gets different questions. On a four player team, the first team member may get the most difficult question while the fourth member of the team may always get the easiest question. The database would simply match the difficulty of the question with player team status.

With dozens of tournaments occurring simultaneously, and players competing in multiple tournaments at the same time, another function of the tournament database is to track which players are entered in what tournaments.

Prediction games are also gaining popularity in online environments. These games involve the player predicting the outcome of a future event, such as the price performance of a stock over the next thirty days or the temperature of a group of cities the following day at noon. Because player selections must be stored until the event in question has transpired, a database is an essential component of the tournament. The database is especially useful for prediction tournaments in which the player chooses from a selection of target performance levels. Players in a weather prediction tournament might choose five cities from a selection of one hundred, and may also choose the hour at which their temperature prediction is to be assessed for each chosen city. The database would contain fields for possible cities, chosen cities, temperatures, and times.

Puzzle games have been popular for many years. Examples include crossword puzzles, jigsaw puzzles, Rubik's Cube™, etc. In one embodiment, the puzzle is posted on the World Wide Web at noon on Saturday. Players submit their answers to the game controller with the first three correct responses receiving a prize or advancing to a further game session. In a jigsaw puzzle competition, teams of players compete to put together an electronic jigsaw puzzle in the shortest time. A puzzle database tracks which players are on which teams, and prevents unauthorized players from participating in puzzles.

Strategy games are also well represented in online tournaments, partly because there have been parallels in the off-line world for so many years in the form of tournament chess, backgammon, bridge, etc. Although the result is a discrete win/lose/draw, the manner in which the player attains the result is critical. There is no such thing as a "correct" answer. An online chess tournament might start with sixty-four players, dropping to half that number each game session as players are eliminated.

Support for complex pairing/matching systems is one of the key benefits provided by tournament databases. After each game session of a Swiss-system (non-elimination) chess tournament, for example, players must be paired again with a different opponent. Information such as the number of previous wins/losses, the color allocation, and the rating of the player all must be incorporated into the pairing in order to ensure the fairness of the competition. Databases also offer the ability to incorporate player preferences into the pairings, allowing a player to list preferred opponents, or people with whom he would rather not play.

Because some strategy tournaments such as chess take place over days or even weeks, database systems are especially useful in maintaining order. These databases can communicate with an email system to provide a tournament coordination system in which players are being constantly informed as to when and with whom their next game is scheduled.

Judgment games require human judgment to establish who will advance to the next game session or win a prize. Examples include essay writing tournaments or art tournaments. Because these forms of competition have no "correct" answer, they obviously cannot be evaluated by computer and so require the participation of human judges. In an exemplary essay writing tournament, players submit a short essay for scoring by a panel of three judges. The average of these three scores is then compared with the scores of other participants. The top ten percent of the scores, for example, could qualify to advance to the next game session in which a new, possibly more lengthy or detailed essay, was submitted. Judgment tournaments are not restricted to text-based entries. In a skating tournament, participants could videotape their skating performance and send a digitized version to the central controller for judging in much the same way that the written essays were submitted.

The database record for every tournament participant might contain all of their submissions to judgment tournaments. This would prevent a player, for example, from submitting the same essay to more than one essay tournaments since all essay submissions could be checked against past submissions.

Databases of judges scores would allow tournament organizers to check the comparability of their scores, determining whether one judge was consistently giving low marks, or whether some judges were giving excessively high marks to a particular player.

Tournaments can also be based on games of luck or chance in which a player has no control over his progression through the tournament. One example is a slot machine tournament in which advancement to the next game session depends on the slot machine payout over the current game session. Since the slot machine payout is determined randomly, each participant in the tournament has the exactly same chance to win. A database of all slot machine outcomes would of course be helpful in verifying the randomness of the algorithms used to create the outcomes.

Lastly, tournaments in which time to completion is the primary method of differentiating among players are also popular. One example is electronic car race simulations in which the shortest lap times receive prizes or awards. A tournament might consist of ten laps around a track, with the shortest time to completion declared the winner.

Many games, of course, exhibit characteristics from two or more of the above categories. A poker tournament, for example, contains elements of both strategy (the way you bet) and luck (the cards you draw).

Tournaments may be held contemporaneously with a live event. A trivia tournament, for example, could be based on a popular television situation comedy with questions based on the actions of characters in the show. Questions could also be asked regarding the anticipated actions of the show's characters, creating a prediction format for the tournament.

In one preferred embodiment, there may be several different game formats represented in a tournament or game session. A tournament, for example, may start with three groups of players—one group answers trivia questions, the next solves a crossword puzzle, while the last group plays electronic football. Qualification to advance to the next game session is based on a player's performance relative to the mean performance of their own group. Each player's score is normalized by converting it into a number of standard deviations above or below the mean. Comparisons are then made among players competing in entirely different games. Any player scoring better than one standard deviation above the mean of his group qualifies for advancement to the next round. In addition to the normalization process, standard deviations can be subjectively adjusted by some numeric constant in order to reflect a perceived difference in the difficulty of the different game formats.

Another variation is to have competitors play the same game format, but with different game parameters. In a golf game, for example, the trajectory of the ball may be affected by wind speed, humidity levels, slickness of the grass, etc. Two competitors hitting a ball with the same club using the same force and the same foot placement might have their ball land in a different spot due to the different game parameters. The wind for one player's shot my be five miles per hour out of the East, while the second player faced a wind speed of twenty miles per hour out of the South.

In another embodiment, the difficulty level of a game session is adjusted as the game session is played. In a conventional trivia tournament, for example, the difficulty of the questions is determined in advance. A tournament might have a series of ten questions that are prepared before the contest. A prize may be awarded to the player with the best score. If there are a large number of participants, however, there may be a number of perfect scores at the end of the contest. In order to increase the probability that there is only one winner at the end, more difficult questions can be used. The problem with this strategy, however, is that less skilled players will feel frustration because of their poor performance. Ideally, questions would become more difficult only if it seemed as though there was a chance of multiple perfect scores. This would allow easy or moderate questions at the beginning of the game to make beginners feel more comfortable, while allowing for more difficult questions to be included if more differentiation is required. Reflexive software provides just such a solution. A pool of game questions are assigned a difficulty level in advance. The first question of the contest is always fairly easy, but the difficulty of subsequent questions is based on the accuracy rate achieved on prior questions. If players are doing well, the questions get harder. Although these techniques are well suited to trivia games, they are also applicable to almost any other game format.

In one embodiment, the time window for a game session has a fixed end time, which means that all the games within the game session must be completed by a certain time. The fixed end time for the game session could be applied only to players in contention for prizes. In a crossword puzzle tournament, for example, after the fixed end time for the final game session has been reached the winners have already been determined. Players who have not yet finished the puzzle can of course continue to work on it beyond the fixed end time, although they are out of contention for prizes.

In another embodiment, the time window for a game session has a fixed start time, which means that all the games or questions within the game session start at the same time. As an example, trivia games preferably should have a fixed start time since a player who starts later would have the advantage of knowing the questions posted to players who had started earlier. This would give the later player the ability to look up the answers in advance of answering them himself, resulting in an unfair advantage. Not all game formats require a fixed start time. Dexterity game formats, for example, may involve a staggered start of players. In a closest to the pin golf tournament, a player beginning after another player has finished is at no particular advantage or disadvantage.

Figure 7:
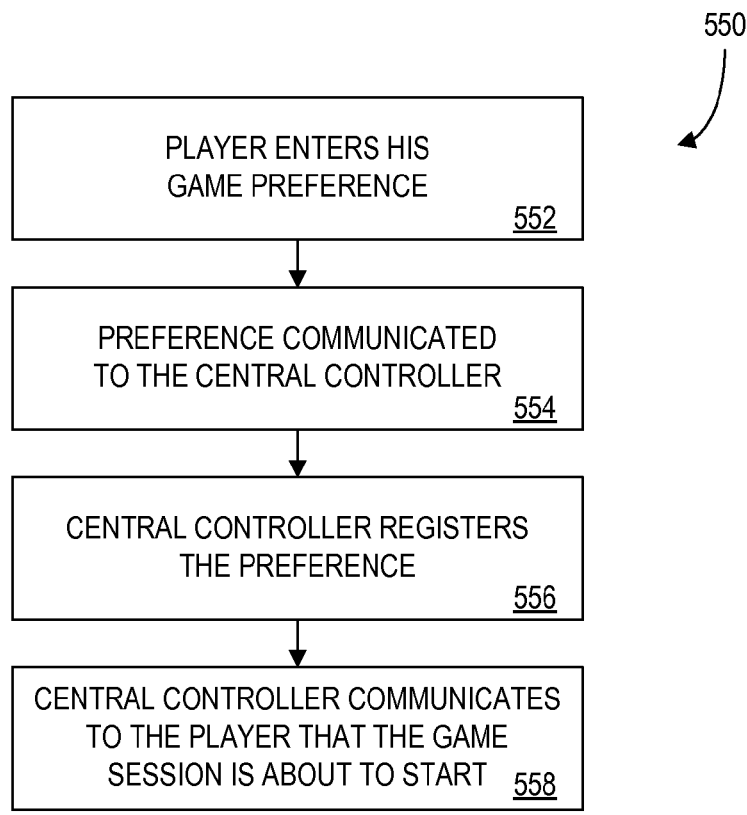
FIG. 7 is a flow process that illustrates a method, in accordance with one embodiment of the present invention, of a player playing in a specific game session with a fixed start time.

One embodiment notifies a player of impending start or end times for tournaments. FIG. 7 shows an example of such a notification process 550 for a tournament with a fixed start time. In that example, the game session has a number of game formats. First, the player enters 552 the game format he prefers to play via the associated I/O device. The preference is communicated 554 to the central controller, which registers 556 the preference. When the game session is five minutes from starting, the central controller sends a start message 558 to the I/O device of the player through the communication network. This communication would typically be electronic mail, although it could take other forms such as audible or visual alerts. Similar mechanisms may be used to alert the player who a game session is about to end.

Note that the game software described does not have to reside completely at the central controller. Part of the game software may reside in the central controller and part of it may reside within the I/O device. This configuration can be implemented in a client/server environment. In the case of an online tournament golf game, for example, if the client/server model is not used then the I/O device acts as a dumb terminal. All of the game software resides on the game controller (server machine), receiving input from the I/O device and sending back the results. The game parameters such as club selection and force of swing are transmitted to the game controller which calculates the new position of the ball. A graphics screen depicting the new ball placement is then downloaded to the I/O device. Because the downloading of detailed graphics screens is such a bandwidth-intensive function, the time of transmission is normally long. Players are forced to wait for a period of time even with relatively fast modems. Although increasing modem speeds are beginning to alleviate these delays in the transmission of graphics, game software graphics usually increase in screen resolution (and hence bandwidth requirement) as new versions are released, partially counteracting the hardware improvements.

Switching to a client/server model for bandwidth-intensive functions may be more appropriate. In the case of the golf game described above, much of the game software can be handled by the I/O device. The I/O device would send the game parameters up to the central controller which would calculate the coordinates of the new ball position. These coordinates would then be sent back down to the I/O device where the game software would generate the graphics display of the new ball position. The time of data transmission is dramatically reduced since no bandwidth intensive functions (transmission of graphics) are required.

There are many different ways for a player to pay his entry fee. In one preferred embodiment, the process steps 204 responsive to payment of an entry fee include the step of providing a number of payment options for the player before he participates in a game session. Payments may be processed non-electronically, such as with cash or checks, or may be communicated electronically with the online transmission of credit card number, digital cash, debit card number, or bank account information for electronic fund transfers. Players may also register any one of the above electronic payment methods with the central controller and then simply use a unique payment identification number for future transactions. A player, for example, could register his credit card number and a password with the central controller. From that time forward, the player would only have to present his password for payment. The central controller would look up the password to find the player's credit card number and would bill the card for the tournament entry fee. This preferred embodiment has the added advantage of eliminating the need for secure transmission of the payment information. A hacker intercepting the player's payment communication with the central controller would get only the password, not the more valuable credit card number. The password has little value as any winnings obtained from the use of another player's account would be credited to that player's credit card and thus would not benefit the hacker.

Figure 8:
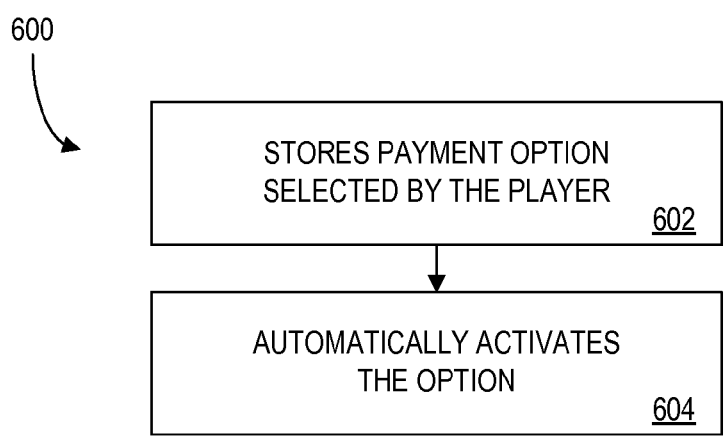
FIG. 8 is a flow process that illustrates a method, in accordance with one embodiment of the present invention, of processing payment.

FIG. 8 shows another type 600 of payment option in which the player approves automatic payments. The player first chooses a preferred method of payment, such as by credit card. This preference is stored 602 at the central controller. The payment option is then activated 604 by any tournament activity by the player. If the player's unique identifier is used in tournament registration, his credit card is automatically charged for the appropriate amount.

The entry fee can also be tied to the amount of time that the player participates in the tournament—the longer he plays, the larger the entry fee. In this preferred embodiment, the tournament system keeps track of the amount of time the player spends in the tournament, billing the player at the end of the tournament. This procedure may be applicable in a flight simulator tournament in which players score points for perfect landings. The more time the player spends at the simulation, the greater the number of opportunities to land.

Much like a student who must complete required prerequisite courses before attending higher level classes, participation in some tournaments may require a confirmation of the player's performance data. Entry into the Star Trek Master's tournament, for example, might require previous participation in at least five of seven Star Trek category tournaments. When the player tries to register for the Master's tournament, the central controller looks up the player's unique identifier to check past performance data. If the performance data do not meet the criteria of the tournament, registration is denied. The player is given a list of the missing qualifications, as well as the starting times of future tournaments that would satisfy those criteria.

Prior tournament history can also be used to handicap players. In registering for a golf tournament, for example, part of the registration process involves the central controller checking to see whether the player has won any prior tournaments, or whether he has simply played in many tournaments. The player receives a handicap value from one to ten, depending on his level of experience. When the tournament starts, players with the most experience start from the tees farthest away from the pin, and face the strongest winds.

A database system allows for creative applications of a common prize pool, which is a set of prizes not associated with a particular tournament. If there are ten trivia tournaments, for example, there could be a prize for the longest string of consecutive correct answers. This could be the longest string within a given tournament, or it could span tournaments so that a player finishing a tournament with a string of correct answers could continue this string in the next tournament he enters. The common prize pool thus spans a number of individual tournaments. Other criteria that could be used include the greatest number of standard deviations above the mean, the greatest number of standard deviations above the lowest score, the best score by a senior citizen, the most consecutive correct answers by a player under thirty years of age, etc.

Databases also allow for entry fees to be paid based on the actions taken within the tournament. In a hole-in-one tournament, players could hit as many balls as they want to, but would be charged for each ball that they hit. In this respect, entry fees are no longer paid in advance, but after the tournament. The number of balls hit can be stored in a database so that the player can participate in multiple tournaments before paying.

Tournament promotions can make extensive use of the information contained within the tournament database. Electronic mail about future bridge tournaments, for example, can go out to any player participating in at least two bridge tournaments in the last year. Tournament databases would also be valuable to companies promoting goods and services. Star Trek™ videos, for example, could be marketed to those players competing in at least three Star Trek™ tournaments per year.

Player complaints about activity from prior tournaments are easily handled by the tournament database. If a player complains that he has not received payment for a tournament victory six months prior, the central controller would pull up the database record for that tournament to see if the player was indeed one of the winners. If he was, the central controller would then access the player's database record to discover whether or not he had be paid.

Normally, tournament prizes are established before the tournament begins. In one preferred embodiment, however, the prizes for a game session depend on the number of players participating in the game session—the more players participating, the larger the prizes.

In another preferred embodiment, each I/O device includes secure memory (RAM, ROM, EPROM, EEPROM, and the like) for storing tournament data. This memory is contained within a secure perimeter, which may include physical, electronic, or a combination of physical and electronic features to resist tampering. For example, physical features could include encapsulation while electronic features could include a silicon firewall. Combination features could include self-zeroing, or otherwise volatile memory, or memory that electrically modifies its contents upon detection of tampering. Such tampering might include physically stressing the device, attempting to change the clock rate by replacing the external power source with a battery outside allowable current or voltage ranges, or attempting to change the clock rate by replacing external power sources with an AC power source operating outside an allowable frequency range. Alternatively, the secure perimeter could be merely tamper-evident. In that case, the device might be returned to the tournament organizers before any large prize could be claimed. As will be appreciated by those skilled in the art, a great variety of tamper-resistant/tamper-evident techniques can be deployed, and will not be enumerated in detail herein. Therefore, as a matter of convenience, terms such as "tamper resistant/tamper-evident" or "secure" shall be understood to refer to any of the aforementioned or other security measures throughout this discussion.

Many tournament embodiments are improved through the use of a secure perimeter. One example is a puzzle tournament in which the time to solution is the critical component of the player's score. One game session may require the player to solve ten short puzzles with the number of seconds required to solve the puzzles being the player's score for that game session. If there is a delay in the communication of the player's answers, perhaps due to latency problems in the online network, the player is penalized by factors outside of his control. If the times of puzzle completion are stored locally in the secure perimeter of the player's I/O device, however, the player may not be penalized. His times would be sent to the central controller at the end of the game session and compared with the times registered by the game controller over the online connection. The player would be credited with the times registered by the processor within the secure perimeter of the I/O device. The secure tamper-resistant nature of the secure perimeter would prevent players from altering their times to solution before they were sent to the central controller.

Payment information likewise benefits from the use of a secure perimeter. An I/O device may store cryptographic keys within the secure perimeter to encrypt credit card information before it is communicated to the game controller.

Figure 9:
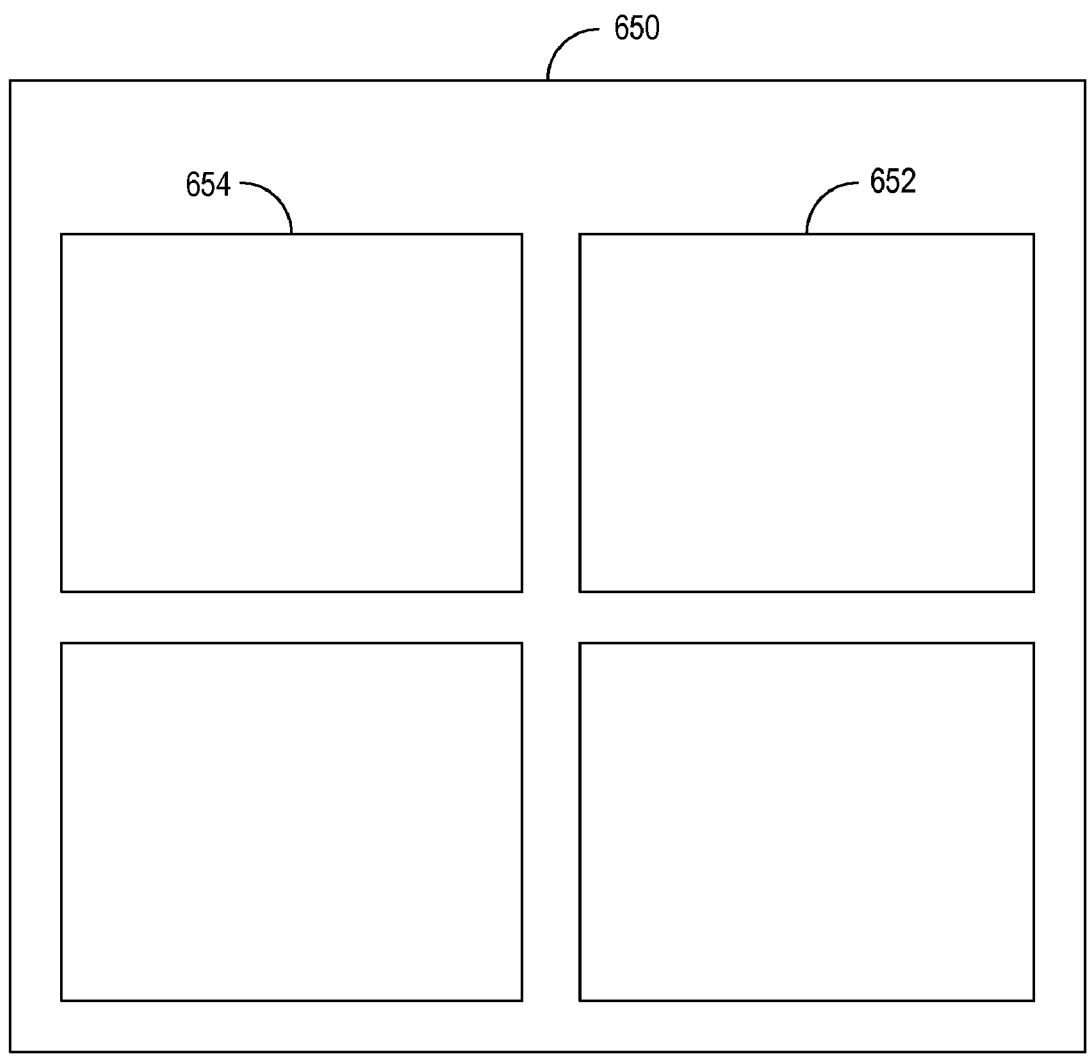
FIG. 9 is an illustration of a Web page in accordance with one embodiment of the present invention.

FIG. 9 shows another preferred embodiment, in which each I/O device includes a screen 650 having multiple windows 652, 654 thereon, with one window 652 displaying the tournament game session in which the associated player is currently participating. The other windows may be displaying documents that the player is working on, while he is playing in the tournament. In one preferred embodiment, the player may enter preferences that determine the size of the window displaying the tournament game session. This entering process can be similar to the player entering his game format preference, as shown in FIG. 7. A player might opt to have the game session window take up a small portion of the I/O device screen at the beginning of a tournament, but expand to a full sized window as the player advances to further game sessions of a given tournament. Thus, the tournament window expands as the possibility of receiving prizes increases.

In one embodiment, the database includes the following fields, and each field includes the corresponding information: (i) Player Information/Demographics (e.g., name, address, age, sex, preferences, billing type, favorite tournament format, start/stop times, opponents, language); (ii) Billing Systems (e.g., credit card numbers of players, bank account numbers for electronic fund transfer (EFT), digital cash accounts, total revenues, aging of accounts receivable, desired frequency of billing, billing dates, payment dates, mailing addresses for prize payments by check); (iii) Tournament Information (e.g., format (trivia, strategy, prediction, etc.), start date/time, stop date/time, duration of tournament, scheduled breaks, scheduled times for player notification/warning, prizes, players currently registered, players currently logged on, cash entry fees received, credit entry fees received, number of game sessions, player qualification requirements, requirements for advancement to subsequent game sessions); (iv) Player History (e.g., list of tournaments played, prizes won, average score, number of times in final round, average time to answer, entry fees paid); and (v) Question/Parameter/Answer Database (e.g., format (trivia, strategy, etc.), creation date, difficulty, number of times it has been used, tournaments that it has been used in, scheduled deletion date, percentage of correct responses, parameter values (wind speed, speed of greens, etc.), results of prediction variables).

The above-described database fields are not meant to be a comprehensive description of a tournament database system. It will be understood by those skilled in the art of tournaments that there are many other possible variations.

According to some embodiments, the invention may be implemented via a gaming Web site or other network-accessible gaming service. Players may log onto this Web site to (i) play video games and/or video game tournaments (hereinafter "video games"); and (ii) win prizes. In accordance with the present invention the Web site may allow players to play video games and win prizes based on the results of these video games. In such embodiments, bonuses may be provided to players who have performed poorly in one or more video games. Performing poorly may include, for example, (i) not winning a prize of at least a predetermined value during a predetermined number of rounds of a video game; (ii) not winning a prize of at least a predetermined value during a predetermined number of video games, (iii) not winning a prize during a predetermined amount of time; (iv) not achieving a predetermined level and/or number of points during a video game; and/or (v) not achieving at least a predetermined ranking relative to other players. The provision of bonuses to players identified as poor players may help to motivate the poor players who may otherwise have difficulty winning prizes.

According some embodiments, a controller may determine a player rating for a player who plays one or more video games. As used herein, a player rating is a measurement of a player's success in at least one video game. This player rating may be an indication of the player's success in at least one video game, and may be determined based on factors such as the number of points won by the player, the number of games played by the player, and the player's win/loss record. For example, a player's player rating may be the average number of points he scores per game played (e.g., the total number of points scored divided by the total number of games played).

In accordance with some embodiments, if a player's player rating is worse than a threshold rating, then he may be eligible to receive a bonus. As used herein, a threshold rating is a measurement that is used to determine whether a player should receive a bonus. For example, if a player has a player rating of less than 3333 points per game, then the player may receive a bonus. It is envisioned that a threshold rating may be set so as to distinguish poor players (e.g., those who may deserve bonuses) from better players (e.g., those who may win prizes more often). A threshold rating may be determined, e.g., by the controller based on an aggregate measurement of performance by a plurality of players. For example, a threshold rating may be set to be one standard deviation below the mean score for players between the ages of 19 and 23.

According to some embodiments, a bonus may include an amount of currency and may be provided to a player whose player rating is worse than a threshold rating. A bonus may also include, for example, an amount of money (e.g., US dollars) and/or an amount of an alternate currency. As used herein, an alternate currency is a currency other than money. Examples of alternate currencies include points, credits, tickets, E-gold™, frequent flyer miles, and phone minutes. Note that alternate currencies may be used to purchase products, services, and other consideration in a manner similar to how money is used.

According to some embodiments, the value of a bonus that is provided to a player may be based on the player's player rating and a threshold rating. A player who has a player rating worse than a threshold rating may be a poor player. For example, a player with a lower player rating may receive a greater bonus. This may help to ensure that poor players who have low player ratings are able to enjoy playing video games and win prizes that they might not otherwise have been able to achieve.

Applicants have recognized certain benefits that may be derived by implementing embodiments wherein poor players are provided with bonuses. For example, poor players may receive bonuses that allow them to purchase prizes and may feel better about their play. Happier players may result in increased traffic and increased revenues for the operator of the Web site via which the present invention is implemented. Further, a merchant or other entity that allows players to utilize accumulated points or other bonus currency to purchase products (e.g., using a combination of accumulated points or other alternate currency obtained during game play and payment not derived from game play) may benefit since the accumulation of more points by players may result in increased purchases of products from the merchant.

In accordance with some embodiments, a controller or other computing device operable to facilitate play of a video game or video game tournament may store certain information that allows the controller or other computing device to determine whether a bonus should be provided to a player. Such information may be stored in a database format. For example, the controller may store a player database, a game database, a bonus determination database, and a bonus tracking database. Other information in addition to or in lieu of that described herein may be utilized to determine whether a bonus should be provided to a player. The information utilized to determine whether a bonus should be provided to a player may be stored in a format other than a database format. Further, additional or different database structures may be utilized other than the structures described herein. For example, a different number or arrangement of databases or fields within databases may be substituted.

A player database may store information about players who may use the system of the present invention. According to some embodiments, the player database may store for each player (i) a player identifier; (ii) a corresponding player's name; (iii) tickets remaining; (iv) points remaining; and (v) a payment identifier.

In some embodiments, players may use tickets to pay entry fees for games. These tickets may be purchased, or obtained through other channels (e.g., tickets may be given away as freebies to new players). In some embodiments, players may win points for performing well when playing video games (e.g., a player may get 100 points for winning a hole in golf). These points may, e.g., be used as an alternate currency that is useful in purchasing prizes (e.g., products or services). A payment identifier may be used to charge a player for products and services that he purchases. A player identifier may be used to purchase at least one ticket or pay an entry fee for a game.

Additional information may also be stored in the player database, including a player's address, password (to provide security), offer history, names and/or contact information of friends (for adaptive marketing embodiments of the invention), prizes redeemed, gaming history, player rating, or purchasing history.

A game database may, for example, store information about games that are played by a player. According to some embodiments, the controller may store a game database for each player identified in the player database. A game database may include the following fields: (i) a game identifier; (ii) a game name; (iii) a cost of game (e.g., in tickets); (iv) a number of points won in one or more games or tournaments (e.g., points won or obtained in previous games or tournaments may be usable in the present game); and (v) a duration of game or tournament (e.g., in minutes and seconds).

A bonus determination database may store information that may be useful in determining bonuses to be provided to players. According to some embodiments, the bonus determination database may include the following fields: (i) a player identifier; (ii) a total number of points won; (iii) a total number of games played; (iv) a player rating; (v) an indication of whether a player rating is below a threshold rating; (vi) an identification of a bonus to be provided to the player, if any.

Note that the number of total points won by a player may be different from the number of points remaining in the player's account (e.g., as stored in the player database). This may be, for example, because a player may have spent points on purchasing prizes. The total number of games played may be, for example, the number of games played within a predetermined amount of time or a number of games played in a tournament. A player rating may be any metric of a player's success in playing games. In one example, a player rating is calculated as the average number of points scored by the player per game played (i.e., total points won/total games played). According to some embodiments, a player may receive a bonus if his player rating is below a threshold rating. The identification of a bonus to be provided, if any, may be utilized to determine whether to provide a bonus and, if so, what bonus is to be provided to a player. According to some embodiments, a bonus may be provided to a player based on his player rating and a threshold rating.

A bonus tracking database may store information about bonuses that may be provided to players. According to some embodiments, the bonus tracking database may include the following fields, identifying for each respective bonus: (i) a player identifier for the player who may receive a bonus (e.g., may match a player identifier in the player database); (ii) an identification and/or a description of a bonus; and (iii) an identification and/or a trigger. According to some embodiments, a trigger is used to determine when a bonus should be provided to a player (i.e., the bonus may be provided when the trigger occurs). The bonus tracking database may also store an indication of a time when the bonus was provided, for tracking purposes. Note that if a bonus has not yet been provided, the time may be listed as "pending".

Figure 10:
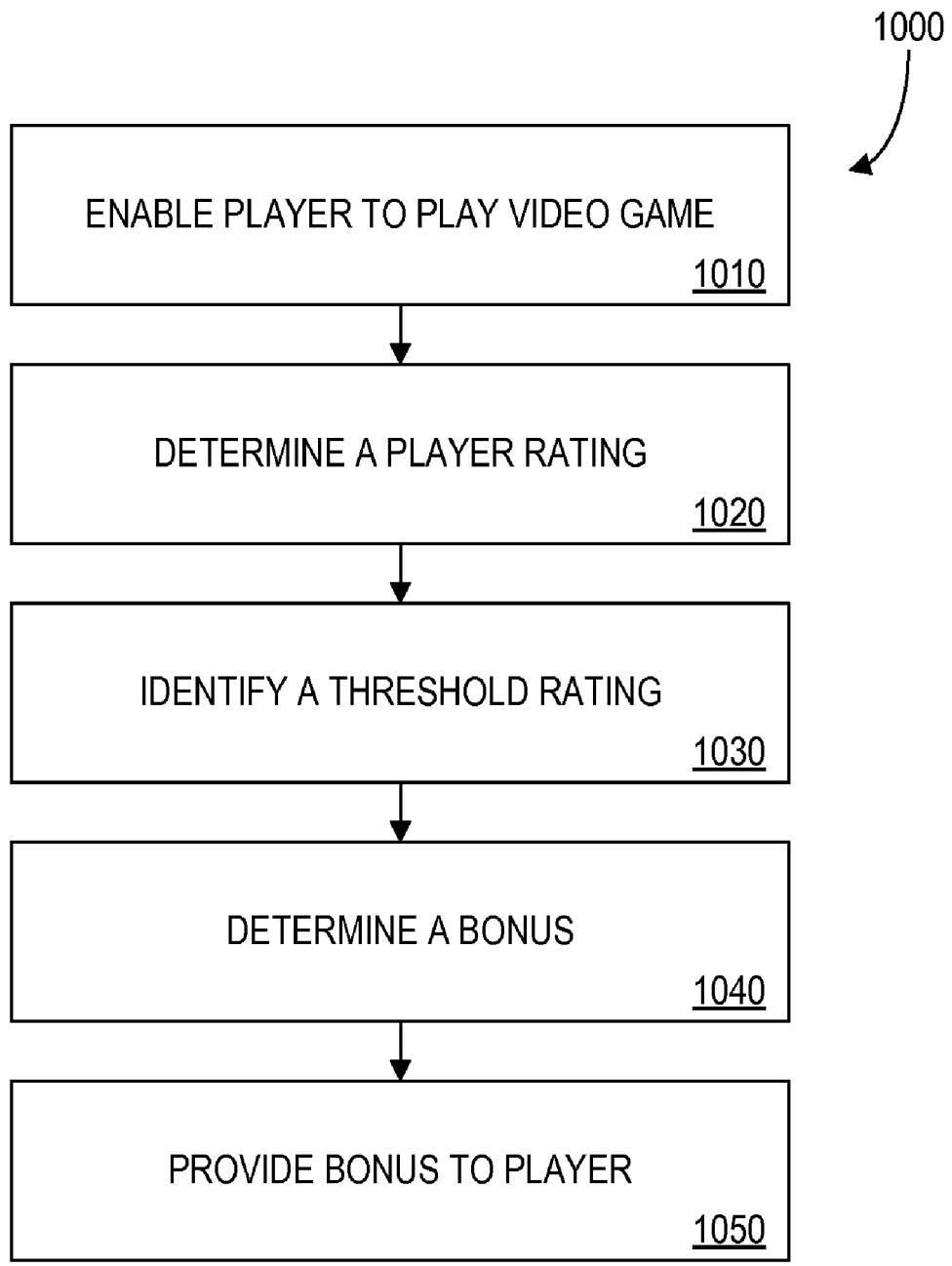
FIG. 10 is a flow process that illustrates a method, in accordance with one embodiment of the present invention, of providing a bonus to a player based on a player rating and a threshold rating.

Referring now to FIG. 10, a process 1000 is provided that illustrates embodiments wherein a player is provided with a bonus based on a player rating and a threshold rating. The process 1000 begins with a step of enabling a player to play a video game (step 1010). The step of enabling a player to play a video game may comprise registration of the player and receipt of an entry fee from the player, facilitating game play, and the awarding of prizes to the player if he earns a prize during game play.

Registration of a player may include identifying a player who would like to play a video game. Identifying a player may include receiving an indication of information from a player such as a user name, password, home telephone number, home address, network address (e.g., IP address), player identification number, or credit card number. The player may provide this indication using a player device (e.g., a personal computer). Information identifying a player may be useful in various ways. For example: a player's IP address may be useful in allowing the player to play a video game over the Internet, a player's user name and password may be useful in preventing somebody else from masquerading as the player, and a player's home address may be useful for providing a bonus to the player (e.g., a bonus or indication of a bonus may be mailed to the player's home address).

According to some embodiments, registering a player may also include receiving payment of an entry fee from a player. An entry fee may be optional or required. Examples of entry fees include money and other currencies. For example, a player may pay $0.25 to play a game. In a second example, a player may pay 10 tickets to play a game. In some embodiments, a player may purchase an alternate currency (e.g., tickets) using money or some other form of consideration (e.g., providing services or products, performing activities, viewing advertisements).

According to some embodiments, a player may provide a payment identifier to pay an entry fee for a game. Thus, the step 1010 of enabling a player to play a video game may include a step of receiving a payment identifier from a player. Examples of payment identifiers include a financial account number (e.g., a credit card number, a debit card number, or a checking account number) and a billing address. According to some embodiments, an entry fee may be paid at various different times. Examples of when an entry fee may be paid include: at the start of a video game, after a game is finished, during a game (e.g., a player may be prompted to insert payment in order to continue an ongoing game), and/or based on a time parameter (e.g., a player may be billed at a rate of 10 tickets per hour for playing a video game).

According to some embodiments, entry fees may be different for different games. For example, it may cost a player 1 ticket to play a round of game X and 6 tickets to play a round of game Y. Further, a plurality of players may share an entry fee for a game. For example, Alice and Bob may decide to work together to solve a crossword puzzle. If an entry fee for a single-player crossword puzzle is normally 4 tickets, Alice and Bob may split this fee between them and each pay 2 tickets (alternatively, they could split the entry fee unevenly; Alice might pay 3 tickets, while Bob might pay 1 ticket). In the above example, if Alice and Bob win a prize in the game, they may split the prize (voluntarily or as a requirement of the game) using one or more agreed-upon rules (e.g., prize is split 50%-50%, prize is split according to ratio of entry fees paid by the players, prize is split according to which player scored the most points).

According to some embodiments, the controller may receive a selection of a game that a player would like to play as part of the step 1010 of enabling a player to play a video game. For example, a player may use a player device to select a game that he would like to play from a list of available games. According to some embodiments, the controller may transmit information to a player device to be displayed or otherwise output to a player using an output device. For example, the controller may transmit an image of a crossword puzzle to a player. In a second example, an audio recording of a trivia question may be output to a player through his cellular telephone.

According to some embodiments, the controller may receive one or more game inputs from a player, which may affect game play, as part of the step 1010 of enabling a player to play a video game. For example, a player may use a keyboard on a personal computer to answer a trivia question. In a second example, a player may use a joystick attached to a set-top box to control a character in Pac-Man™.

According to some embodiments, the controller may provide one or more prizes to a player during a video game, as part of the step 1010 of enabling a player to play a video game. A prize may be any form of consideration, including currencies (e.g., money, points), products, and services. For example, a player may score 300 points for answering a trivia question correctly in a game that has 10 trivia questions. In another example, a player may receive 200 points for eating a ghost in Pac-Man™.

According to some embodiments, the controller may determine an outcome for a video game played by a player as part of the step 1010 of enabling a player to play a video game. The outcome may be based on inputs provided by the player as well as other factors related to game play (e.g., rules of the game, inputs by other players, random numbers). According to some embodiments, at least one prize may be awarded to a player based on an outcome of a video game. Examples of prizes include (i) money and other currencies; (ii) products (e.g., a toaster oven); (iii) services (e.g., a free game, access to premium gaming services); (iv) coupons or gift certificates; and (v) any other form of consideration. According to some embodiments, points that are obtained during play of a game may be used as a currency to purchase prizes. For example, a player may score points for events during a game of Pac-Man™ (e.g., 200 points for eating a ghost), and finish the game of Pac-Man™ with a total of 3500 points. The player may then combine these 3500 points with 16800 other points that he has won to purchase a prepaid phone card. The controller may then debit these points from the player's account as part of a transaction. In some embodiments, a player may combine points that are scored in multiple different games to purchase a single prize. Points obtained based on game events during a first game may be equivalent to points obtained based on game events in a second game.

Alternatively, points that are obtained during play of a game may be converted into credits or money that may be used to purchase prizes. For example, player may score 12309 points in a game of trivia. These 12309 points may be converted to 3200 credits using a function or a conversion table. The player may then use these 3200 credits to purchase prizes. According to some embodiments, points may be converted into credits in such a manner that results in the amount of points being converted to approximately the same amount of credits. For example, the following formula may be used to convert points to credits, money or some other currency used to purchase prizes:

(number of credits)=1000+100*(points scored)/(maximum points possible in game)

Using a formula such as the one presented above to convert points into credits may allow the controller to ensure that most players will receive the same number of credits and poor players will not be discouraged (e.g., all players will win approximately 1000 credits per game).

According to some embodiments, a prize of a currency may be credited to an account associated with a player. For example, a player may win $3 in a game of trivia. An indication of this monetary amount may be stored in a financial account associated with the player, as identified by a payment identifier (e.g., a bank account number). In a second example, a player may win 3400 points in a game and these points may be credited to his account in a player database stored by the controller (e.g., such as the player database described above).

Returning now to process 1000, after the step of enabling game play, a player rating is determined in step 1020. As described above, a player rating may be a measurement of the player's success in at least one video game. For example, an expert player may have a high player rating, whereas an unskilled player may have a low player rating.

A player rating may be determined based on a variety of factors, such as (i) measurements obtained based on play of at least one game; (ii) intra-game events; (iii) games played by other players; (iv) activities on a game-related Web site; (v) characteristics of the player; (vi) expected gaming activities; and (vii) information provided by persons other than the player.

Examples of measurements obtained based on play of at least one game include (i) number of points scored in at least one game; (ii) time spent playing at least one game; (iii) outcomes of one or more games played by the player; (iv) number of games played; (v) number of games won; (vi) number of games lost; (vii) value of prizes won in at least one game; (viii) value of entry fees paid for at least one game; and (ix) type of games the player has played (e.g., easy games vs. hard games). In some embodiment, other factors related to games may be conditioned on what type of games a player has played. For example, a player who has won points in many difficult games and not played any easy games may receive a high player rating. Measurements obtained based on play of at least one game may include a player's gaming history (e.g., trends and improvement in game scores) and information associated with opponents who have been defeated by the player (e.g., an example of how many opponents have been defeated by the player and/or the relative skill of the opponents).

Examples of intra-game events that may affect a player rating include: (i) inputs/moves made by the player (e.g., an indication of whether the player uses big words when playing Scrabble® or an indication of what path the player followed through a maze); (ii) items collected by a player during game play (e.g., power-ups in Pac-Man®); (iii) intra-game prizes won by a player (e.g., 200 points for spelling a word in Scrabble®); (iv) an outcome of a round of a game (e.g., scoring a strike on a single frame in bowling); and (v) trends and improvement during a game (e.g., the player doesn't make the same mistake every time).

Examples of factors relating to games played by other players include: (i) an average number of points scored by other players on the gaming Web site; (ii) an average number of points scored by a group of players (e.g., all the other players with the same zip code as the player, all the other players in the player's age group, all players who have played the same number of games as the player); (iii) information relating to competitors of the player (e.g., a player lost by 50 points to another player); (iv) factors relating to teammates of the player (e.g., Alice and Bob may team up to play a game of golf and Bob's player rating may then be affected by Alice's score in the game); and (v) games played by computers (e.g., a "bot" may play a game of video golf to determine par for the course, a bot may play a game hundreds of times to generate a score distribution for the game).

As described above, the controller may operate a Web site that enables players to play video games. In such embodiments a player rating may be based on factors relating to activities by a player when using the Web site. Examples of such factors include: (i) patterns of browsing by the player (e.g., a player who looks at the help page often may be a novice player); (ii) patterns of accessing information by the player (e.g., if a player checks the high score table often, this may be an indication that he is concerned about his performance relative to other players); (iii) prizes viewed or purchased by the player (e.g., in embodiments where players may use points to purchase prizes through the Web site); (iv) a player's account balance.

Examples of characteristics of a player that may affect a player rating include: (i) demographic information of the player and other players (e.g., age, gender, home town); (ii) the player device used by the player (e.g., it may be more difficult to play a video game on a cell phone because of the limited screen space or black and white screen); and (iii) other information that may be stored in a player database such as the one described above.

According to some embodiments, a player's player rating may be based on his expected gaming activities. Examples of expected gaming activities include: (i) expected learning curve for a player (e.g., statistics may show that older players may learn to play action games more slowly therefore an older player may have lower player ratings for longer periods of time until they learn how to play action games); (ii) a commitment by a player to play video games (e.g., a player may have accepted an offer to receive a $10 gift certificate to a retailer if he agrees to play 50 video games in the next week); (iii) patterns of game play by the player (e.g., a player may log on every night at 10 pm to play video games and usually improve his high score by 100 points).

According to some embodiments, various persons other than a player may rate the player or provide other indications that may be useful in determining a player rating. Examples of information provided by persons other than the player include: (i) indications by an employee associated with the operator of a gaming Web site (e.g., an operator of the controller may review games that have been played by a player to determine the player's skill level); and (ii) indications by other players (e.g., Alice may rate Bob's play as a 7 out of 10, while Carl may rate Bob's play as a 6 out of 10 and Bob's player rating may then be determined by averaging these ratings from other players).

It should be noted that a player rating may be determined based on a single game. For example, a player who gets a low score in Pac-Man™ may receive a low player rating based on this game and receive a bonus based on this player rating. Alternatively, a player rating may be based on a plurality of games. For example, the controller may calculate a player's average score over his last 20 games. In a second example, the controller may calculate a player rating based on a player's top 10 scores in his last 20 games.

As described, the controller may base a determination of a player rating on a variety of different factors. According to some embodiments, a player rating may be calculated using a mathematical function. This function may be based on one or more variables, including the factors described above. Properties of functions are known to those skilled in the art and need not be described in detail here. Examples of functions that may be used to calculate a player rating include:

$$\text{player rating} = f((\text{number of points won}), (\text{number of tickets spent})) \quad (1)$$

$$\text{player rating} = (\text{total points scored in all games})/(\text{number of games played}) \quad (2)$$

$$\text{player rating} = (\text{total points scored})/(\text{number of tokens spent on entry fees}) \quad (3)$$

$$\text{player rating} = (\text{number of games won})/(\text{number of games played}) \quad (4)$$

$$\text{player rating} = 100 * (\text{win/loss ratio}) \quad (5)$$

$$\text{player rating} = 3333 - (\text{number of points won})/(\text{number of tickets paid as entry fees}) \quad (6)$$

$$\text{player rating} = \text{sum of}[(\text{average score in game } A) * (\text{difficulty of game } A)] \text{ where game } A \text{ represents each game that is played by the player} \quad (7)$$

$$\text{player rating} = (\text{average score by a competitor of the player}) - (\text{average score by the player}) \quad (8)$$

$$\text{player rating} = (\text{total number of points scored so far by the player}) + (\text{expected number of points to be scored during the player's next 20 games}) \quad (9)$$

$$\text{player rating} = (\text{average number of points scored in games \#11-20}) - (\text{average number of points scored in games \#1-10}) \quad (10)$$

$$\text{player rating} = \text{average increase in points scored per game played} \quad (11)$$

It should be noted that a player rating may be calculated in variety of other ways. In some embodiments, a player rating may be calculated using a look-up table. For example, a player's current point total and number of games played may be used as the x and y indices of a table. The entry located at this index in the table may be a player rating for the player.

According to some embodiments, a first player may team up with other players to play team games. In such team game embodiments, a player rating for the first player may be calculated based on the performance of the team. Example methods of determining a player rating in such team game embodiments include: (i) the first player may get the same rating as other players on his team, regardless of his own contribution to the team (e.g., success by teammates may affect the first player's player rating); and (ii) the first player's player rating may be determined based on what portion of the team's success is attributable to the first player (e.g., how many of the team's total points were scored by the first player).

It should be noted that in some embodiments, a relatively higher player rating may correspond to a worse player (i.e., a player rating of 100 is better than a player rating of 200). Alternatively, a relatively higher player rating may correspond to a better player (i.e., a player rating of 200 is better than a player rating of 100).

It should further be noted that in accordance with some embodiments a minimum and/or maximum player rating may be set (e.g., all players are rated on a scale of 1 to 10, with 10 being the best). Alternatively, there may be no minimum or maximum player rating.

A player rating may or may not be a numerical value. For example, players may be rated as being either "good" or "bad". In another example, a player rating may be a numerical value such as an integer, a positive integer, or a real number.

A player rating may be a relative ranking. For example, a player may have a player rating of being $121^{st}$ out of 200 players. In a second example a player may have a player rating of being in the bottom quartile of players with his level of experience.

According to some embodiments, a player rating for a player may be stored in a bonus determination database, such as described above.

Returning now to process 1000, after the step 1020 of determining a player rating the process continues to the step 1030, in which step a threshold rating is determined. According to some embodiments, a player rating may be compared to a threshold rating to determine whether a player should receive a bonus. For example, if the player rating is worse than the threshold rating, the player may receive a bonus according to the method of the invention. In some embodiments a threshold rating may be determined for use with or associated with a particular player (e.g., a threshold rating may be determined for comparison to the player rating of a particular single player). In other embodiments a threshold rating may be determined for use with or associated with a plurality of players (e.g., a threshold rating may be determined and compared to the player ratings of all players playing a particular game during a particular period of time to determine whether those players should be provided bonuses).

It should be noted that depending on how player ratings are calculated, there are various ways that a player rating may be worse than a threshold rating. In one example, a player rating that is less than or below a threshold rating may be considered a player rating that is worse than a threshold rating. In this example a player associated with a greater or higher player rating may be considered a better player than a player associated with a lesser or lower player rating. In another example, a player rating that is greater than or higher than a threshold rating may be considered a player rating that is worse than a threshold rating. In this example a player associated with a greater or higher player rating may be considered a worse player than a player associated with a lesser or lower player rating.

According to some embodiments, a threshold rating may be a range of values. For example, a player may receive a bonus if his player rating falls between 1000 and 2000. Note that according to such embodiments, players with player ratings of less than 1000 or greater than 2000 may not receive bonuses or may not receive the bonuses or types of bonuses associated with the threshold rating of value range of 1000-2000.

According to some embodiments, a plurality of respective threshold ratings may be implemented. In such embodiments, a different bonus or bonus type may be associated with each respective threshold rating. For example, a first bonus may be provided to players associated with a player ratings worse than a first threshold rating and a second bonus may be provided to players associated with player ratings better than the first threshold rating but worse than the second threshold rating.

A threshold rating may be identified in a variety of different ways. In some embodiments a threshold rating may be set by a system administrator or other user input. For example, an employee of a gaming Web site may operate an input device (e.g., a computer keyboard) to input a threshold rating of 3333 points per ticket into the controller. In other embodiments a threshold rating may be determined by a computing device, such as the controller. For example, the controller may determine a threshold rating using a process specified in a computer program stored in the memory of the controller.

According to some embodiments, a threshold rating may be determined based on aggregate measurements of performance by players. This determination may be based on factors similar to those described for determining a player rating (e.g., player characteristics, measurement of player performance, intra-game events, etc). Examples of aggregate measurements include mean, median, standard deviation, mode, and variance.

According to some embodiments, a threshold rating may be determined based on one or more games played. For example, the controller may search one or more game databases such as the one described above and select a plurality of games to use as a sample group. The controller may then determine a threshold rating (e.g., an aggregate rating) based on the plurality of games in this sample group. For example, the controller may set a threshold rating to be a mean score in the sample group of games. Exemplary sample groups of games include: (i) all games player by all players on a Web site; (ii) games played by players associated with a particular player (e.g., determined using the first player's buddy list for instant messaging); (iii) games played by teammates of a particular player (e.g., a player's teammates may be determined by accessing logs in a game database); (iv) games played by competitors of a particular player; (v) games played by players who have a certain level of experience (e.g., games played by players who have played less than 30 games); (vi) games played by players who have at least one particular characteristic (e.g., novice players, players from Oregon, players age 50 or older); (vii) games played by all players except for a certain group (e.g., all players except the ones who have scored more than 1,000,000 points); and (viii) games of a certain type (e.g., Pac-Man™ games, word games, gold-level games, game types that have been played by the player).

In some embodiments a threshold rating may be determined (e.g., by the controller) based on a determination of a distribution of scores by players in video games. Based on this distribution of scores, the $10^{th}$ percentile may be identified and a threshold rating set at a level such that the worst 10% of players will receive bonuses. In other embodiments a threshold rating may be determined (e.g., by the controller) by ranking all players who are less than 21 years old from best to worst and a threshold rating may be set such that the 100 worst players receive bonuses.

In other embodiments a threshold rating may be determined by determining the average number of points won per ticket by all players on the Web site. A threshold rating may then be set to be 1000 points less than this average number of points won per ticket.

In yet other embodiments a threshold rating may be set (e.g., by the controller) such that it is one standard deviation below the mean player rating achieved by all players in games.

In some embodiments a threshold rating may be determined (e.g., by the controller) by determining an average number of points scored per ticket for each video game on a Web site (e.g., using a game database such as the one described above) and determining a threshold rating based on these averages and the number of times that a particular player played each game.

In some embodiments a threshold rating may be determined based on other players associated with a particular player. For example, the controller may determine who a player's friends are (e.g., using the player's buddy list for instant messaging) and set a threshold rating to be two standard deviations below the mean player rating of all the player's friends.

Referring again to process 1000, after the step 1030 of determining a threshold rating, the process continues to step 1040. A bonus is determined in step 1040. Determining a bonus may include determining whether a bonus should be provided to the player and/or which bonus or type of bonus should be provided to the player. As discussed above, in some embodiments the controller may provide a bonus to a player if a player rating of the player is worse than a threshold rating.

According to some embodiments, a bonus may include an amount of a currency. A currency, as used herein, is a medium of exchange that includes monetary (e.g., U.S. dollars, Japanese yen, British pounds) and non-monetary currency. Examples of non-monetary currencies include: (i) points (e.g., points won by playing video games); (ii) tickets, credits, or tokens (e.g., tickets that are used to pay entry fees for video games); (iii) frequent flyer miles (e.g., such as those issued by USAir™); (iv) phone minutes (e.g., such as those stored on an AT&T™ long distance calling card); (v) comp points (e.g., as issued by casinos); and (vi) other currencies that may be used to purchase products or services from some retailers (e.g., E-gold™). The term alternate currency may be used to describe such non-monetary currencies. It should be noted that alternate currencies such as points, tickets, or frequent flyer miles are a subset of the category "currencies". Alternate currencies may be used to purchase products, services, and other consideration in a manner similar to how money is used in society every day. In alternate embodiments, a bonus may include one or more products, services, or discounts on products or services, in addition to or instead of an amount of currency.

In some embodiments a bonus may be an adjustment of the video game or the player's performance in the video game. For example, a player may be advanced to a higher or subsequent level or portion of a video game as a bonus. In another example, a player's character may be provided with certain skills, powers, or tools as a bonus. In yet another example, a player's ranking may be adjusted to a better rating as a bonus.

According to some embodiments, a value of a bonus may be determined. A value of a bonus may be determined based on a variety of factors, including: (i) a player rating; (ii) a threshold rating; (iii) measurements associated with at least one game; (iv) intra-game events; (v) games played by players other than the player who is to receive the bonus; (vi) activities on a game-related Web site; (vii) characteristics of the player who is to receive the bonus; (viii) expected gaming activities; (ix) other benefits received by the player who is the receive the bonus (e.g., a player may have already received previous bonuses or other benefits); (x) activities performed by the player who is to receive the bonus (e.g., a player may perform an activity as specified by a subsidizer); and (xi) other factors deemed relevant by an entity implementing the methods of the present invention.

According to some embodiments, a value of a bonus may be determined (e.g., by the controller) based on a player rating and a threshold rating. For example, the value of the player rating may influence the value of the bonus and the value of the threshold rating may influence the value of the bonus. In such an example, the controller may provide greater benefits to players who have worse player ratings than other player. For example, Anne may have a player rating of 2510 points per game, whereas Jim may have a player rating of 2964 points per game. While both player ratings are less than a threshold rating of 3333 points per game, Anne may receive a bonus of 800 points while Jim receives a bonus of 300 points. This may be appropriate because Anne is a worse player and needs more help than Jim.

According to some embodiments, a value of a bonus may be determined based on an amount by which a threshold rating exceeds a player rating. In such embodiments, the term "exceeds" means "better than" (domain subjective), as opposed to literally "greater than" (objective). Accordingly, "exceeds" means "better than" regardless of whether a higher or lower number of points is better.

According to some embodiments, a value of a bonus may be determined based on a difference between a threshold rating and a player rating. In such embodiments, the term "difference" means "arithmetic difference" (i.e. subtraction). For example, a player may have a player rating of 2000 and the controller may determine that this player rating is less than a threshold rating of 3000. The player may thus receive a bonus of 1000 points (determined by subtracting 2000 from 3000). In another example a player may have a player rating of 2000 points/hour and the controller may determine that this player rating is less than a threshold rating of 3000 points/hour. The player may thus receive a bonus of 4000 points (determined by subtracting 2000 from 3000 and then multiplying by the number of hours that the player has been playing (4 hours)).

According to some embodiments, a value of a bonus may be determined based on a ratio of a player rating to a threshold rating. In such embodiments, the term "ratio" means "arithmetic division". In one example a player may have a player rating of 2000 and the controller may determine that this player rating is less than a threshold rating of 4000. The player may thus receive a bonus of 600 points (determined by dividing the threshold rating (4000) by the player rating (2000) and then multiplying by 300 points).

According to some embodiments, a value of a bonus may be determined based on a function of a player rating and a threshold rating. In such embodiments, the term "function" means the value of the player rating influences the value of the bonus, the value of the threshold rating influences the value of the bonus, and other values may influence the value of the bonus. In one example a player may have a player rating of 2000 and the controller may determine that this player rating is less than a threshold rating of 4000. The player may thus receive a bonus of 600 points (determined by dividing the threshold rating (4000) by the player rating (2000) and then multiplying by 300 points).

According to some embodiments, a bonus determination database to determine and/or store a value of a bonus to be provided to a player. One embodiment of a bonus determination is described above.

The value of a bonus may be determined for use in determining the particular bonus or type of bonus to be provided to the player. In some embodiments the value of a bonus (e.g., a monetary value) to be provided is first determined. Then a particular bonus is selected based on that determined value. In embodiments where the bonus is an amount of currency the determined value of the bonus may be used directly to determine the amount of currency to be provided to the player as a bonus. For example, if the value of a bonus is determined to be 100, the bonus may be determined to be 100 points or $100. The determined value of the bonus may be converted to the amount of currency using a function. For example, the determined value of the bonus may be multiplied by a predetermined percentage to determined the amount of currency to be provided to the player as the bonus. In such an example, assuming the determined value of the bonus is 100 and the predetermined percentage is 50%, the bonus would be determined to be 50 points or $50 (i.e., (100)*(0.50)=50).

In embodiments where the bonus is a product or service the determined value of the bonus may be used to select a bonus from a plurality of available bonuses. In such embodiments the available bonuses may each be assigned a value or range of values. Alternatively, the available bonuses may be grouped into subsets according to a value or range of values. In such embodiments the determined value may be used to select a particular bonus by selecting a bonus that is associated with a value that matches the determined value or that is associated with a range of values into which the determined value fits. In embodiments where the bonus is a discount amount on the price of a product or service the determined value of the bonus may be used to set the amount of the discount to be provided to the customer as the bonus.

Referring again to process 1000, after the step 1040 of determining a bonus, the process continues to step 1050. The bonus is provided to the player in step 1050. According to some embodiments, step 1050 may include providing the bonus determined in step 1040 to the player. For example, assuming the bonus is an amount of monetary currency, the amount of currency may be caused to be deposited in a financial account associated with the player. In other embodiments the step 1050 may include dispensing the bonus to the player. For example, assuming the player is playing at a device capable of dispensing tickets and the bonus is a number of tickets, the device may be directed to dispense the appropriate number of tickets to the player.

In some embodiments the step 1050 of providing a bonus may include at least one of the following steps: (i) identifying a triggering condition; (ii) crediting the bonus to an account associated with the player; and (iii) transmitting an indication of the bonus.

According to one embodiment, a bonus may be provided to a player in response to identifying the occurrence of a condition. Such a condition is referred to as a triggering condition herein (i.e., a condition the occurrence of which causes a bonus to be provided to a player). A triggering condition may include any event, circumstance, or condition that, e.g., relates to a player's activities at a gaming Web site. Providing a bonus to a player based on an occurrence of a triggering condition may be advantageous because it allows the controller to provide bonuses at times that, e.g., are particularly motivational to players. For example, the controller may provide a bonus to player who has played a predetermined number of consecutive rounds of a game that have not corresponded to a prize or other win (i.e., a losing streak). Providing a bonus to a player in such a circumstance may help to raise the spirits of the player and prevent the player from becoming discouraged and thus stop playing the game.

In some embodiments the controller determines that a player is about to cease playing a video game or participating in a video game tournament based on the occurrence of a triggering condition. In such embodiments a bonus may be provided to the player in order to motivate the player to continue playing. For example, a triggering condition that indicates that a player is about to cease playing a video game or participating in a video game tournament may be that a player (i) is in the bottom X percentile of players (e.g., based on player rankings) of all players participating in a tournament; (ii) has not achieved a certain level or number of points in a game during a predetermined amount of time; or (iii) has attempted to log off the gaming Web site.

A wide variety of different types of triggering conditions are within the scope of the present invention. Such triggering conditions may be classified into example categories such as (i) events or conditions relating to results of games; (ii) events or conditions relating to scoring in games; (iii) events or conditions in games; (iv) events or conditions relating to paying entry fees; (v) events or conditions relating to making purchases; (vi) time-related events or conditions; (vii) events or conditions relating to browsing a Web site; (viii) events or conditions relating to offers; (ix) indications by players; and (x) events or conditions relating to players other than the subject player.

Examples of triggering conditions that relate to results of games include: (i) the player wins a game or a round of a game; (ii) the player loses a game or a round of a game; (iii) the player wins a plurality of games; (iv) the player loses a plurality of games; (v) the player achieves an average score over a plurality of games; (vi) the player's score is greater than a threshold value (e.g., more than 1000 points); (vii) the player's score is less than a threshold value (e.g., less than 1000 points); (viii) the player scores better than one or more other players; (ix) the player scores worse than one or more other players; (x) the player wins a prize based on his performance in a game; (xi) the player does not win a prize based on his performance in a game; (x) the player's score increases successively in each of a predetermined number of games; and (xi) the player's score drops successively in each of a predetermined number of games. The above examples do not comprise an exclusive list of triggering conditions that relate to results of games. Other examples are within the scope of the present invention.

Examples of triggering conditions relating to scoring in games include (i) the player collects at least one item in a game (e.g., in Pac-Man™, the player eats a power-up); (ii) the player scores at least one point in a game (e.g., spells a word in Scrabble™); (iii) the player loses at least one point in a game (e.g., the player is penalized 2 shots for hitting his ball into a lake in a golf video game); (iv) the player identifies at least one item in a game (e.g., the player circles a word in a crossword puzzle); (v) the player causes a change of change of state in the game (e.g., in Pac-Man™, the player's character is killed by a ghost). The above examples do not comprise an exclusive list of triggering conditions that relate to scoring in games. Other examples are within the scope of the present invention.

Examples of other game-related triggering conditions include (i) the player achieves an intermediate result in a game (e.g., hits a ball into a sand trap in golf); (ii) conditions relating to a character controlled by the player (e.g., the player's avatar in Ultima™ is low on stamina); (iii) the player starts a game or a round of a game; (iv) the player finishes a game or a round of a game; and (v) inputs that the player provides as part of a game (e.g., the player spells the word "telephone" when playing Scrabble™). The above examples do not comprise an exclusive list of triggering conditions that relate to games. Other examples are within the scope of the present invention.

Examples of triggering conditions relating to paying entry fees include (i) the player is asked to pay an entry fee; (ii) the player pays or does not pay an entry fee; (iii) the player opts to split an entry fee with at least one other player; (iv) the player is asked to provide a payment identifier; and (v) the player provides or does not provide a payment identifier. According to some embodiments, a player may purchase products through a controller (e.g., using money or an alternate currency obtained by playing games). The above examples do not comprise an exclusive list of triggering conditions that relate to paying entry fees. Other examples are within the scope of the present invention.

Examples of triggering conditions relating to making purchases include (i) the player indicates that he may be interested in purchasing a product (e.g., by adding it to an electronic shopping cart); (ii) the player views information about a prize (e.g., by accessing a web page); (iii) the player purchases a product; and (iv) the player bids on a product (e.g., in an embodiment in which players purchase prizes using points or some other an alternate currency won by playing games). The above examples do not comprise an exclusive list of triggering conditions that relate to making purchases. Other examples are within the scope of the present invention.

Examples of triggering conditions that relate to time include (i) the current time of day or day of the year is a predetermined time (e.g., the player's birthday, tax day, Christmas); (ii) the player takes more or less than a threshold amount of time to complete a game or set of games; (iii) the player delays for a predetermined period of time before making a move in a game; (iv) the player is inactive for a predetermined period of time; (v) the player has been continuously logged onto the Web site for a predetermined period of time; (vi) the player has not logged onto the Web site for a predetermined period of time; and (vii) the player is waiting for a software download. The above examples do not comprise an exclusive list of triggering conditions that relate to time. Other examples are within the scope of the present invention.

Examples of triggering conditions relating to browsing a Web site include (i) requesting a file (e.g., through http or ftp); (ii) viewing a file (e.g., a Web page); (iii) providing information (e.g., typing a home address, filling out a form); (iv) logging in to a secure section of a Web site; (v) going to a particular section of a Web site (e.g., the customer service section, or a section that describes a particular game); (vi) leaving a Web site (e.g., logging off); (vii) viewing or interacting with an advertisement (e.g., clicking on a banner ad); and (viii) viewing a prize (e.g., a prize that is available to be purchased using points won by playing video games). The above examples do not comprise an exclusive list of triggering conditions that relate to browsing a Web site. Other examples are within the scope of the present invention.

An example of triggering conditions that relate to indications from a player is receiving an indication from a player indicates that the player would like to receive a bonus. Triggering conditions relating to other players that are associated with the subject player may be similar to the triggering conditions listed above. For example, an event of a first player winning a prize may trigger a bonus to be given to a second player. Examples of other players associated with the player include (i) family members, friends, and other associates of the subject player; (ii) a player who is playing the same game as the subject player; (iii) a player who sends instant messages to the subject player. The term "subject player" as used herein means the player in relation to whom it is being determined whether a triggering condition has occurred.

Returning now to step 1050 wherein a bonus is provided to a player, as described above, in accordance with some embodiments, this step may include the step of crediting an amount of a bonus to an account associated with the player. The account may be, e.g., a financial account, a player's casino account, a credit account, a debit account, or any other type of account that stores a balance of a currency. Examples of crediting an amount of a bonus to an account associated with a player include (i) adding a bonus of 2000 points to a point balance in a player account stored by a controller associated with a casino; (ii) adding a bonus of $20 to a player's bank account stored by a bank; (iii) adding a bonus of 1000 frequent flyer miles to a player's frequent flyer account with an airline; and (iv) crediting a bonus of $10 to a player's credit card balance, thereby reducing the player's account balance that is due to be paid. According to some embodiments, a player may receive a bonus that is credited to his account for use in purchasing one or more prizes.

According to some embodiments, a bonus may be provided to a player at substantially the same time that the player is making a purchase. In such embodiments, the bonus may be provided in the form of a discount on one or more purchases that are being made by the player. In one example of such an embodiment assume a controller determines that a player has a player rating worse than a threshold rating and deserves to receive a bonus of 2000 points. Accordingly, the next time the player attempts to purchase a prize, the controller may provide the player with a discount (e.g., of 2000 points or $10) on the prize that the player purchases. Note that the discount (e.g., the 2000 points or $10) may never be credited to the player's account; the player may simply be able to purchase the prize for a reduced price. In another example, a player may indicate that he is interested in purchasing a prize using points that he has won by playing video games. However, the prize may cost 50,000 points and the player may only have 47,000 points. Based on the player's poor player rating, the cost of the prize, and the player's account balance, the controller may provide the player with a bonus of 3000 points that allows him to purchase the prize. If the 50,000-point prize is being sold by a merchant other than the controller, the 3000-point bonus may provided directly to the merchant (so that the merchant receives the full price of 50,000 points for the prize). According to some embodiments, a bonus of a currency may be credited to an account belonging to a merchant who is selling a prize. In yet another example, a player may indicate that he is interested in purchasing more tickets, which may be used to pay entry fees for video games. Based on the player's player rating, the controller may determine that the player should receive a bonus of 5 free tickets. These tickets may be immediately provided to that player so that the player does not have to purchase more tickets.

According to some embodiments, a bonus may be a product, service, or other form of consideration. Accordingly the bonus may be provided to a player in any appropriate manner (e.g., a product may be mailed to the player, the player may receive a gift certificate good for a service).

According to some embodiments, an indication of a bonus may be stored in a bonus tracking database, such as described above. Storing an indication of a bonus in a bonus tracking database may be useful for customer service and accounting purposes.

Returning now to step 1050 where a bonus is provided to a player, as described above this step may include the step of transmitting an indication of the bonus (e.g., to the player who is to receive the bonus). According to some embodiments, a controller may cause an indication to be provided to the player who informs the player that he has received or will receive a bonus. For example, the controller may transmit the indication through a communication network (e.g., the Internet) to a player device operated by the player (e.g., a personal computer). The player device may then display the indication to the player using an output device (e.g., a CRT monitor). Other examples of providing an indication of a bonus include (i) a player may use his personal computer to view a message on a Web page indicating that he has received a bonus of 2000 points; (ii) a pop-up window on a Web page may indicate to a player that he is about to receive a bonus of 2000 points; (iii) a player may receive an e-mail indicating that he has received a bonus of 2 tickets; (iv) a player who uses a first player device (e.g., a personal computer) to play video games may use a second player device (e.g., a cellular telephone) to receive an indication that he has won a bonus.

An indication of a bonus may be transmitted before, after, or at substantially the same time that the bonus is provided to a player. For example, a player may receive a message "You have just received a bonus" at a time when a bonus is being added or credited to an account associated with the player. In another example, a player may receive a message "Here is a bonus for you", wherein the message includes an indication of the bonus (e.g., the message includes a code that corresponds to a 10% discount that the player may utilize in obtaining a discount on purchases). In yet another example, a player may receive a message "You are about to receive a bonus" at a time before an amount is added or credited to an account associated with the player or at a time before a gift certificate is mailed to the player.

According to some embodiments, an indication of a bonus may be presented to a player by an employee of an entity operating the controller. In such embodiments an output device associated with the controller may be used to prompt the employee to present the bonus to the player. For example, the controller (e.g., via a CRT monitor) may display information about a bonus to a call center employee. The call center employee may then use a telephone to call a player and tell the player that he has or is about to receive a bonus.

According to some embodiments, the controller may also indicate information about a bonus to other persons besides the player who receives the bonus. Such information may be provided to the other persons in addition to or instead of being provided to the player. Further, the information provided to the player may or may not be the same information that is provided to the other persons. For example, the controller may provide a bonus of 1000 points to a player and transmit an e-mail notification of this bonus to the player and one or more friends or associates of the player. The e-mail notification may or may not include the exact amount of the bonus. In one embodiment of this example, the controller may transmit an indication of the bonus to the player. The indication may identify the amount of the bonus and the account number of the player to which the bonus is being added. The controller may also transmit a second notification of the bonus to a friend of the player. The second notification may identify the bonus amount but not the account number. Transmitting an indication to friends of a player may be motivational for the player himself (e.g., because he is being recognized in front of his peers), as well as for the friends of the player (e.g., because this may motivate the friends to also play and attempt to obtain a bonus for themselves).

It should be noted that in some embodiments of the present invention more than one triggering condition may need to occur before a bonus is provided to a player. For example, a bonus may be provided to a player if it is determined that the player has lost a consecutive predetermined number of rounds of a game and the player is attempting to log off the Web site.

It should be understood that in accordance with some embodiments of the present invention a player may play a game or participate in a tournament via a Web site by using a player device. As used herein a player device may be a computing device the player used to communicate with a controller or other computing device operating in accordance with the present invention. For example, a player may use a personal computer to connect to a Web site maintained by the controller. Examples of player devices include: a personal computer, a laptop computer, a personal digital assistant (PDA), a telephone, a cellular or other portable telephone, a video game terminal, and a set-top box.

It should also be understood that video games, as used herein, include a variety of video games playable by one or more players. Examples of video games that may be played by a player include: (i) single-player games; (ii) competitive games (i.e., games wherein one player competes against another player); (iii) cooperative games (i.e., team games wherein players cooperate with one another during game play); (iv) games which include a component of skill; and (v) games which include a component of chance. Further, although the term "video game" is used, a video game may not have any video component. For example, an all-audio game that is played over a telephone would qualify as a video game in accordance with the present invention.

Although facilitating play of a video game has been described herein as being performed by a controller in communication with one or more player devices, according to some embodiments, a game may be hosted or facilitated by a device other than the controller or in conjunction with a device other than the controller. For example, the controller may act as a listing service for a peer-to-peer network in which players play games against each other.

According to some embodiments, a player may play multiple video games or participate in multiple video game tournaments simultaneously. For example, a skilled player may play 2 games of trivia at the same time. In a second example, a player may play 3 hands of blackjack at the same time.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:
1. A system, comprising:
a processor; and
a storage device in communication with the processor and storing instructions adapted to be executed by the processor to:
facilitate a play of a game session of a first game by a first player;
facilitate a play of a game session of a second game by a second player, wherein the first game is a different type of game than the second game;
determine a first mean score associated with the game session of the first game;
determine a second mean score associated with the game session of the second game;

normalize a first score achieved by the first player in the game session of the first game by converting the first score into a first number of standard deviations from the first mean;

normalize a second score achieved by the second player in the game session of the second game by converting the second score into a second number of standard deviations from the second mean;

determine that one or more of the first and second number of standard deviations is greater than a pre-determined threshold, wherein the pre-determined threshold comprises one standard deviation; and determine, based on the first and second number of standard deviations, that one or more of the first and second players, respectively, qualify for advancement to a subsequent round of a tournament.

2. The system of claim 1, wherein the first mean score is determined based on scores achieved by a plurality of different players having played the first game.

3. The system of claim 2, wherein the first mean score is determined based on scores achieved by the plurality of different players having participated in the game session of the first game.

4. The system of claim 1, wherein the second mean score is determined based on scores achieved by a plurality of different players having played the second game.

5. The system of claim 4, wherein the second mean score is determined based on scores achieved by the plurality of different players having participated in the game session of the second game.

6. An apparatus, comprising:
a processor; and
a storage device in communication with the processor and storing instructions adapted to be executed by the processor to:
facilitate a play of a game session of a first type of game by a first player;
facilitate a play of a game session of a second type of game by a second player, wherein the first type of game is different than the second type of game;
determine a first mean score associated with the game session of the first type of game;
determine a second mean score associated with the game session of the second type of game;
normalize a first score achieved by the first player in the game session of the first type of game by converting the first score into a first number of standard deviations from the first mean;
normalize a second score achieved by the second player in the game session of the second type of game by converting the second score into a second number of standard deviations from the second mean;
determine, based on the first and second number of standard deviations, that one or more of the first and second players, respectively, qualify for advancement to a subsequent round of a tournament; and
adjusting the first number of standard deviations by a numeric constant that is based on a difficulty associated with the first type of game.

7. The system of claim 6, wherein the first mean score is determined based on scores achieved by a plurality of different players having played the first game.

8. The system of claim 7, wherein the first mean score is determined based on scores achieved by the plurality of different players having participated in the game session of the first game.

9. The system of claim 6, wherein the second mean score is determined based on scores achieved by a plurality of different players having played the second game.

10. The system of claim 9, wherein the second mean score is determined based on scores achieved by the plurality of different players having participated in the game session of the second game.

11. A non-transitory computer-readable medium storing instructions adapted to be executed by a processor to:
facilitate a play of a game session of a first game by a first player;
facilitate a play of a game session of a second game by a second player, wherein the first game is a different type of game than the second game;
determine a first mean score associated with the game session of the first game;
determine a second mean score associated with the game session of the second game;
normalize a first score achieved by the first player in the game session of the first game by converting the first score into a first number of standard deviations from the first mean;
normalize a second score achieved by the second player in the game session of the second game by converting the second score into a second number of standard deviations from the second mean;
determine that one or more of the first and second number of standard deviations is greater than a pre-determined threshold, wherein the pre-determined threshold comprises one standard deviation; and
determine, based on the first and second number of standard deviations, that one or more of the first and second players, respectively, qualify for advancement to a subsequent round of a tournament.

12. A non-transitory computer-readable medium storing instructions adapted to be executed by a processor to:
facilitate a play of a game session of a first type of game by a first player;
facilitate a play of a game session of a second type of game by a second player, wherein the first type of game is different than the second type of game;
determine a first mean score associated with the game session of the first type of game;
determine a second mean score associated with the game session of the second type of game;
normalize a first score achieved by the first player in the game session of the first type of game by converting the first score into a first number of standard deviations from the first mean;
normalize a second score achieved by the second player in the game session of the second type of game by converting the second score into a second number of standard deviations from the second mean;
determine, based on the first and second number of standard deviations, that one or more of the first and second players, respectively, qualify for advancement to a subsequent round of a tournament; and
adjusting the first number of standard deviations by a numeric constant that is based on a difficulty associated with the first type of game.

* * * * *